United States Patent
Krishnan et al.

(10) Patent No.: US 11,490,122 B2
(45) Date of Patent: Nov. 1, 2022

(54) METHOD AND APPARATUS FOR VIDEO CODING

(71) Applicant: Tencent America LLC, Palo Alto, CA (US)

(72) Inventors: Madhu Peringassery Krishnan, Mountain View, CA (US); Xin Zhao, Santa Clara, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 24 days.

(21) Appl. No.: 17/322,258

(22) Filed: May 17, 2021

(65) Prior Publication Data

US 2022/0094983 A1     Mar. 24, 2022

Related U.S. Application Data

(60) Provisional application No. 63/082,812, filed on Sep. 24, 2020.

(51) Int. Cl.
*H04N 19/60*     (2014.01)
*H04N 19/124*     (2014.01)
(Continued)

(52) U.S. Cl.
CPC .......... *H04N 19/60* (2014.11); *H04N 19/124* (2014.11); *H04N 19/132* (2014.11);
(Continued)

(58) Field of Classification Search
None
See application file for complete search history.

(56) References Cited

U.S. PATENT DOCUMENTS

| 2016/0227252 A1* | 8/2016 | Gamei | H04N 19/122 |
| 2020/0260116 A1* | 8/2020 | Francois | H04N 19/12 |

FOREIGN PATENT DOCUMENTS

| JP | H0965334 A * | 7/1997 | |
| WO | WO-2013003284 A1 * | 1/2013 | ........... H04N 19/124 |
| WO | WO-2020016795 A2 * | 1/2020 | ........... H04N 19/105 |

OTHER PUBLICATIONS

English Machine Translation of JP-H0965334A.*
(Continued)

*Primary Examiner* — Mohammed Jebari
(74) *Attorney, Agent, or Firm* — ArentFox Schiff LLP

(57) ABSTRACT

Aspects of the disclosure provide a method and an apparatus including processing circuitry for video decoding. The processing circuitry can decode coding information of a transform block (TB) from a coded video bitstream. The coding information can indicate a transform skip in one direction for the TB. The processing circuitry can de-quantize transform coefficients in the TB based on a plurality of quantization steps. First transform coefficients in the TB can be de-quantized based on a smallest of the plurality of quantization steps. The first transform coefficients in the TB can include one of a first row and a first column of the transform coefficients in the TB that has a DC spatial frequency. The one of the first row and the first column can be along the one direction of the transform skip. The processing circuitry can perform an inverse transform on the de-quantized transform coefficients in the TB.

20 Claims, 18 Drawing Sheets

(51) Int. Cl.
  *H04N 19/46* (2014.01)
  *H04N 19/132* (2014.01)
  *H04N 19/176* (2014.01)
  *H04N 19/18* (2014.01)
(52) U.S. Cl.
  CPC .......... *H04N 19/176* (2014.11); *H04N 19/18* (2014.11); *H04N 19/46* (2014.11)

(56) References Cited

OTHER PUBLICATIONS

Peter de Rivaz et al., AV1 Bitstream & Decoding Process Specification, Jan. 18, 2019. (681 pages).
Benjamin Bross et al., General Video Coding Technology in Responses to the Joint Call for Proposals on Video Compression with Capability beyond HEVC; IEEE Transactions on Circuits and Systems for Video Technology. 2019. (16 pages).
Chun-Chi Chen et al., "Screen Content Coding Using Non-Square Intra Block Copy for HEVC", 2014 (6 pages).
Mei Guo et al., Inter-Layer Adaptive Filtering for Scalable Extension of HEVC, PCS, 2013, 165-168 (4 pages).
Mei Guo et al., Inter-Layer Intra Mode Prediction for Scalable Extension of HEVC, PCS, 2013, pp. 317-320 (4 pages).
PoLin Lai et al., Low Latency Directional Filtering for Inter-Layer Prediction in Scalable Video Coding using HEVC, PCS, 2013, pp. 269-272 (4 pages).
PoLin Lai et al., Combined Temporal and Inter-Layer Prediction for Scalable Video Coding using HEVC, PCS, 2013, pp. 117-120 (4 pages).
Shan Liu et al., Global/Local Motion-Compensated Frame Interpolation for Low Bitrate Video, 2000, 12 pages.
Shan Liu et al., Non-linear Motion-compensated Interpolation for Low Bit Rate Video. 2000, 11 pages.
Shan Liu et al., Nonlinear motion-compensated interpolation for low-bit-rate video, Proceedings of SPIE vol. 4115, Applications of Digital Image Processing XXII, Dec. 28, 2000, 12 pages.
Shan Liu et al., MCI-embedded Motion Compensated Prediction for Quality Enhancement of Frame Interpolation, 2000, 11 pages.
Shan Liu et al., MCI-embedded motion-compensated prediction for quality enhancement of frame interpolation, Proceedings of SPIE vol. 4209, Multimedia Systems and Applications III, Mar. 22, 2001, 12 pages.
Heung-Yeung Shum et al., Advances in Multimedia Information Processing—PCM 2001, Second IEEE Pacific Rim Conference on Multimedia, Beijing, China, Oct. 24-26, 2001; 10 pages.
Shan Liu et al., Improved Video Coding via Adaptive Selection of Generalized Motion Prediction Modes for B Frames; Picture Coding Symposium, 2001, pp. 358-361 (4 pages).
Shan Liu et al., Complexity Reduction of Joint Temporal-Spatial Allocation Using R-D Models for Video Streaming; IEEE ICIP, 2002, pp. 729-732 (4 pages).
Shan Liu et al., MPEG Video Transcoding with Joint Temporal-Spatial Rate Control, Proceedings of SPIE vol. 4790, Applications of Digital Image Processing XXV, Nov. 21, 2002, 13 pages.
Shan Liu et al., Joint Temporal-Spatial Rate Control with Approximating Rate-Distortion Models, Proceedings of SPIE vol. 4671, 2002, pp. 746-755 (10 pages).
Shan Liu et al., Joint Temporal-Spatial Rate Control for Adaptive Video Transcoding, IEEE ICME 2003, II225-II228 (4 pages).
Shan Liu et al., Hybrid global-local motion compensated frame interpolation for low bit rate video coding, J. Vis. Commun. Image R. 14 (2003), pp. 61-79 (19 pages)
Shan Liu et al., Efficient MPEG-2 to MPEG-4 Video Transcoding, Image and Video Communications and Processing 2003, SPPIE vol. 5022 (2003), pp. 186-195 (10 pages).
Shan Liu et al., Joint Temporal-Spatial Bit Allocation for Video Coding with Dependency, IEEE Transactions on Circuits and Systems for Video Technology, vol. 15, No. 1, Jan. 2005, pp. 15-26 (12 pages).
Shan Liu et al.; Video Prediction Block Structure and the Emerging high Efficiency Video Coding Standard, 2012, 4 pages.
Shan Liu et al., Rectangular Partitioning for Intra Prediction in HEVC, 2012, 6 pages.
Jian Lou et al., Complexity and Memory Efficient GOP Structures Supporting VCR Functionalities in H.264/AVC, IEEE 2008, pp. 636-639 (4 pages).
Jian Lou et al., Trick-Play Optimization for H.264 Video Decoding, TR2010-076, Sep. 2010, 15 pages.
Wei Pu et al., Palette Mode Coding in HEVC Screen Content Coding Extension, IEEE Journal on Emerging and Selected Topics in Circuits and Systems, vol. 6, No. 4, Dec. 2016, 420-432 (13 pages).
Shan Liu et al., Bit-depth Scalable Coding for High Dynamic Range Video, TR2007-078, Apr. 2008, 12 pages.
Yu-Chen Sun et al., Palette Mode—A New Coding Tool in Screen Content Cording Extensions of HEVC, IEEE ICIP 2015, pp. 2409-2413 (5 pages).
Yu-Chen Sun et al., Improved Palette Index Map Coding on HEVC SCC, IEEE ICIP 2016, pp. 4210-4214 (5 pages).
Xiaozhong Xu et al., PU Level Intra Block Copying with Flipping Mode, APSIPA 2014, 7 pages.
Xiaozhone Xu et al., PU Level Intra Block Vector Prediction in Intra Block Copy for HEVC Screen Content Coding, 2015 Data Compression Conference, IEEE, 2015, pp. 273-282 (10 pages).
Xiaozhong Xu et al., Intra Block Copy in HEVC Screen Content Coding Extensions, IEEE Journal on Emerging and Selected Topics in Circuits and Systems, 2016, 11 pages.
Ximin Zhang et al., Intra Mode Coding in HEVC Standard, 2012, 6 pages.
Yao-Jen Chang et al., Intra prediction using multiple reference lines for the versatile video coding standard, 2019, 8 pages.
Zhaobin Zhang et al., Fast Adaptive Multiple Transform for Versatile Video Coding, 2019 Data Compression Conference (DCC), IEEE 2019, pp. 63-72 (10 pages).
Zhaobin Zhang et al., Fast DST-7/DCT-8 with Dual Implementation Support for Versatile Video Coding, IEEE Transactions on Circuits and Systems for Video Technology, 2020, 17 pages.
Xin Zhao et al., Novel Statistical Modeling, Analysis and Implementation of Rate-Distortion Estimation for H.264/AVC Coders, IEEE Transactions on Circuits and Systems for Video Technology, vol. 20, No. 5, May 2010, pp. 647-660 (14 pages).
Xin Zhao et al., NSST: Non-Separable Secondary Transforms for Next Generation Video Coding, IEEE, 2016, 5 pages.
Xin Zhao et al., Low-Complexity Intra Prediction Refinements for Video Coding, IEEE, PCS 2018, pp. 139-143 (5 pages).
Xin Zhao et al., Joint Separable and Non-Separable Transforms for Next-Generation Video Coding, IEEE Transactions on Image Processing, 2018, 13 pages.
Xin Zhao et al., Coupled Primary and Secondary Transform for Next Generation Video Coding, IEEE, 2018, 4 pages.
Liang Zhao et al., Wide Angular Intra Prediction for Versatile Video Coding, Data Compression Conference (DCC), IEEE, 2019, pp. 53-62 (10 pages).
Benjamin Bross et al., Versatile Video Coding (Draft 2), Document: JVET-K1001-v6, Joint Video Experts Team (JVET) of ITU-T SG 16 WP 3 an ISO/IEC JTC 1/SC 29/WG 11, 11th Meeting: Ljubljana, SI, Jul. 10-18, 2018, 140 pages.
Benjamin Bross et al., Versatile Video Coding (Draft 6), Document: JVET-O2001-vE, Joint Video Experts Team (JVET) of ITU-SG 16 WP 3 and ISO/IEC JTC 1/SC 29/WG 11, 15th Meeting: Gothenburg, SE, Jul. 3-12, 2019, 456 pages.
L. Zhao et al., CE3-related: Unified MPM list based on CE3-3.3 and CE3-3.5.1 (JVET-N0394), Mar. 2019, 12 pages.
Liang Zhao et al., CE3-related: Unified MPM list based on CE-3.3 and CE3-3.5.1. Document JVET-N0394-r2, Mar. 2019, 11 pages.
Appendix A, JVET-N0394-test1 (3 pages).
Appendix B, JVET-N0394-test2 (3 pages).
Appendix C, JVET-N0394-test3 (3 pages).
Appendix D, JVET-N0394-test4 (3 pages).
Appendix E, JVET-N0394-test5 (3 pages).
Appendix F, JVET-N0394-test6 (3 pages).
Appendix G, JVET-N0394-test7 (3 pages).

(56) References Cited

OTHER PUBLICATIONS

Fabien Racapéet al., CE3-related: Wide-angle intra prediction for non-square blocks, JVET-K0500, 10 pages.
Fabien Racepéet al., CE3-related: Wide-angle intra prediction for non-square blocks, JVET-K0500_r1, 7 pages.
Fabien Racapéet al., CE3-related: Wide-angle intra prediction for non-square blocks, JVET-K0500_r2, 7 pages.
Fabien Racapéet al., CE3-related: Wide-angle intra prediction for non-square blocks, JVET-K0500_r3, 12 pages.
Fabien Racapéet al., CE3-related: Wide-angle intra prediction for non-square blocks, JVET-K0500_r4, 13 pages.
Appendix H, JVET-K0500-BMS (2 pages).
Appendix I, JVET-K0500-VTM (2 pages).
Appendix J, JVET-K0500-VTM-NoBF (2 pages).
Appendix K, JVET-L0283_CE3-1.1.1-VTM (3 pages).
Appendix L, JVET-L0283_CE3-1.1.2-VTM (3 pages).
Appendix M, JVET-L0283_CE3-1.1.3_C1-VTM (3 pages).
Appendix N, JVET-L0283_CE3-1.1.3_C2-VTM (3 pages).
Appendix O, JVET-L0283_CE3-1.1.3_C3-VTM (3 pages).
Appendix P, JVET-L0283_CE3-1.1.3-VTM (3 pages).
Appendix Q, JVET-L0283_CE3-1.1.4-VTM (3 pages).
Benjamin Bross et al., CE3: Multiple reference line intra prediction (Test 1.1.1, 1.1.2, 1.1.3 and 1.1.4), Document:JVET-L0283-v2, 7 pages.
Benjamin Bross et al., Versatile Video Coding (Draft 2), Document: JVET-K1001-v6, 141 pages.
Xin Zhao et al., CE6: On 8-bit primary transform core (Test 6.1.3), Document: JVET-L0285, 17 pages.
Appendix R, JVET-L0285_CE6-1.3a (2 pages).
Appendix S, JVET-L0285_CE6-1.3b (2 pages).
Appendix T, JVET-L0285_CE6-1.3b_LowQP (2 pages).
Appendix U. JVET-L0285_CE6-1.3a_LowQP (2 pages).
Xin Zhao et al., CE6: On 8-bit primary transform core (Test 6.1.3), Document: JVET-L0285-r1, 17 pages.
Xin Zhao et al., CE6: Fast DST-7/DCT-8 with dual implementation support (Test 6.2.3), Document: JVET-M0497, 11 pages.
Appendix V, JVET-M0497-CE6-2-3a (2 pages).
Appendix W, JVET-M0497-CE6-2-3a_LowQP (2 pages).
Xin Zhao et al., CE6-related: Unified LFNST using block size independent kernel, Document: JVET-O0539-v2, 13 pages.
Appendix X, JVET-O0539-vs-CE6-2.1a (2 pages).
Appendix Y, JVET-O0539-vs-CE6-2.1a-LowQP (2 pages).
Appendix Z, JVET-O0539-vs-CE6-2.1b (2 pages).
Appendix AA. JVET-O0539-vs-CE6-2.1b-LowQP (2 pages).
Appendix AB, JVET-O0539-vs-VTM5_r1 (2 pages).
Appendix AC, JVET-O0539-vs-VTM5-LowQP_r1 (2 pages).
Appendix AD, JVET-O0545_Log2MaxTbSize=4 (3 pages).
Appendix AE, JVET-O0545_Log2MaxTbSize=5 (2 pages).
Appendix AF, JVET-O0545_Log2MaxTbSize=6 (2 pages).
Xin Zhao et al., Non-CE6: Configurable max transform size in VVC, Document: JVET-O0545-v2, 6 pages.

\* cited by examiner

| Transform Type | Basis function $T_i(j)$, $i,j=0, 1,\ldots, N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

FIG. 9

| Transform Types | Description | Prediction mode | |
| --- | --- | --- | --- |
| | | Intra | Inter |
| DCT_DCT | DCT ↓ and → | ✓ (all block sizes) | ✓ (all block sizes) |
| ADST_DCT | ADST ↓; DCT → | ✓ (block size ≤ 16×16) | ✓ (block size ≤ 16×16) |
| DCT_ADST | DCT ↓; ADST → | | |
| ADST_ADST | ADST ↓ and → | | |
| FLIPADST_DCT | FLIPADST ↓; DCT → | ✗ | ✓ (block size ≤ 16×16) |
| DCT_FLIPADST | DCT ↓; FLIPADST → | | |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16×16) | ✓ (block size ≤ 32×32) |
| V_DCT | DCT ↓; IDTX → | ✓ (block size < 16×16) | ✓ (block size ≤ 16×16) |
| H_DCT | IDTX ↓; DCT → | | |
| V_ADST | ADST ↓; IDTX → | ✗ | ✓ (block size < 16×16) |
| H_ADST | IDTX ↓; ADST → | | |
| V_FLIPADST | FLIPADST ↓; IDTX → | ✗ | ✓ (block size < 16×16) |
| H_FLIPADST | IDTX ↓; FLIPADST → | | |

*FIG. 10A*

| Intra prediction | Vertical Transform | Horizontal Transform |
|---|---|---|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

FIG. 10B

$$L_c = \begin{bmatrix} w_c + v_{c1} & -w_c & & & & 0 \\ -w_c & 2w_c & -w_c & & & \\ & -w_c & \ddots & \ddots & & \\ & & \ddots & 2w_c & -w_c & \\ & & & -w_c & w_c + v_{c2} \\ 0 & & & & & \end{bmatrix} \text{ for } w_c > 0$$

METHOD AND APPARATUS FOR VIDEO CODING

INCORPORATION BY REFERENCE

This present disclosure claims the benefit of priority to U.S. Provisional Application No. 63/082,812, "QUANTIZER DESIGN FOR ONE-DIMENSIONAL TRANSFORM SKIP" filed on Sep. 24, 2020, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and/or decoding. In some examples, an apparatus for video decoding includes processing circuitry. The processing circuitry can decode coding information of a transform block (TB) from a coded video bitstream. The coding information can indicate a transform skip in one direction for the TB. The processing circuitry can de-quantize transform coefficients in the TB based on a plurality of quantization steps. First transform coefficients in the TB can be de-quantized based on a smallest of the plurality of quantization steps. The first transform coefficients in the TB can include one of a first row and a first column of the transform coefficients in the TB that has a DC spatial frequency. The one of the first row and the first column can be along the one direction of the transform skip. An inverse transform can be performed on the de-quantized transform coefficients in the TB.

In an example, the one direction is a horizontal direction, and the one of the first row and the first column is the first row of the transform coefficients in the TB. The processing circuitry can de-quantize the first row of the transform coefficients in the TB based on the smallest of the plurality of quantization steps, and de-quantize remaining rows of the transform coefficients in the TB based on another one of the plurality of quantization steps.

In an example, the one direction is a horizontal direction, and the one of the first row and the first column is the first row of the transform coefficients in the TB. The processing circuitry can de-quantize the first row and one or more additional rows of the transform coefficients in the TB that are adjacent to the first row based on the smallest of the plurality of quantization steps. The first transform coefficients in the TB can further include the one or more additional rows of the transform coefficients in the TB. The processing circuitry can de-quantize remaining rows of the transform coefficients in the TB based on another one of the plurality of quantization steps.

In an example, the one direction is a vertical direction, and the one of the first row and the first column is the first column of the transform coefficients in the TB. The processing circuitry can de-quantize the first column of the transform coefficients in the TB based on the smallest of the plurality of quantization steps, and de-quantize remaining columns of the transform coefficients in the TB based on another one of the plurality of quantization steps.

In an example, the one direction is a vertical direction, the one of the first row and the first column is the first column of the transform coefficients in the TB. The processing circuitry can de-quantize the first column and one or more additional columns of the transform coefficients in the TB that are adjacent to the first column based on the smallest of the plurality of quantization steps. The first transform coefficients in the TB can further include the one or more additional columns of the transform coefficients in the TB. The processing circuitry can de-quantize remaining columns of the transform coefficients in the TB based on another one of the plurality of quantization steps.

In an embodiment, the processing circuitry can decode a flag. The flag can indicate whether to de-quantize the first transform coefficients based on the smallest of the plurality of quantization steps. The processing circuitry can de-quantize the first transform coefficients in the TB based on the smallest of the plural of quantization steps in response to the flag indicating that the first transform coefficients are to be de-quantized based on the smallest of the plurality of quantization steps. In an example, the flag is associated with one of: the TB, a plurality of TBs including the TB, a coding tree block, and a tile. In an example, the flag is indicated in one of a video parameter set (VPS), an sequence parameter set (SPS), an adaptive parameter set (APS), a picture parameter set (PPS), and a slice header.

In an example, a height and a width of the TB are $2^N$ and $2^M$ samples, respectively, N and M being integers larger than 1.

In an embodiment, the coding information further indicates that a quantization matrix is enabled. The quantization matrix can include a respective element corresponding to each of the transform coefficients in the TB. The elements in each row or column of the quantization matrix along the one direction can have a same value. The processing circuitry can obtain the plurality of quantization steps based on initial quantization steps and the quantization matrix.

In an example, the first transform coefficients correspond to one of the initial quantization steps, and remaining transform coefficients in the TB that correspond to one of (i) the remaining rows and (ii) the remaining columns in the TB that have AC spatial frequencies correspond to another one of the initial quantization steps. The one of (i) the remaining rows and (ii) the remaining columns in the TB can be along the one direction. The processing circuitry can obtain the smallest of the plurality of quantization steps based on the one of the initial quantization steps and a value of one of a first row and a first column of the quantization matrix. The one of the first row and the first column of the quantization matrix can be along the one direction. The processing circuitry can obtain remaining ones of the plurality of quantization steps for the one of the remaining rows and the remaining columns in the TB based on the other one of the initial quantization steps and respective values of one of remaining rows and remaining columns of the quantization matrix. The one of the remaining rows and the remaining columns of the quantization matrix can be along the one direction.

In an example, the first transform coefficients can further include one of (i) one or more rows of the transform coefficients in the TB that are adjacent to the first row and (ii) one or more columns of the transform coefficients in the TB that are adjacent to the first column. The one of (i) the one or more rows and (ii) the one or more columns in the TB can be along the one direction. The first transform coefficients can correspond to one of the initial quantization steps, and remaining transform coefficients in the TB can correspond to another one of the initial quantization steps. The processing circuitry can obtain the smallest of the plurality of quantization steps based on the one of the initial quantization steps and a value of one of a first row and a first column of the quantization matrix. The one of the first row and the first column of the quantization matrix can be along the one direction.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 9 shows examples of primary transform basis functions according to embodiments of the disclosure.

FIG. 10A shows exemplary dependency of availability of various transform kernels on a transform block size and a prediction mode according to embodiments of the disclosure.

FIG. 10B shows exemplary transform type selections based on an intra prediction mode for a chroma component according to embodiments of the disclosure.

DETAILED DESCRIPTION OF EMBODIMENTS

Figure 1A:
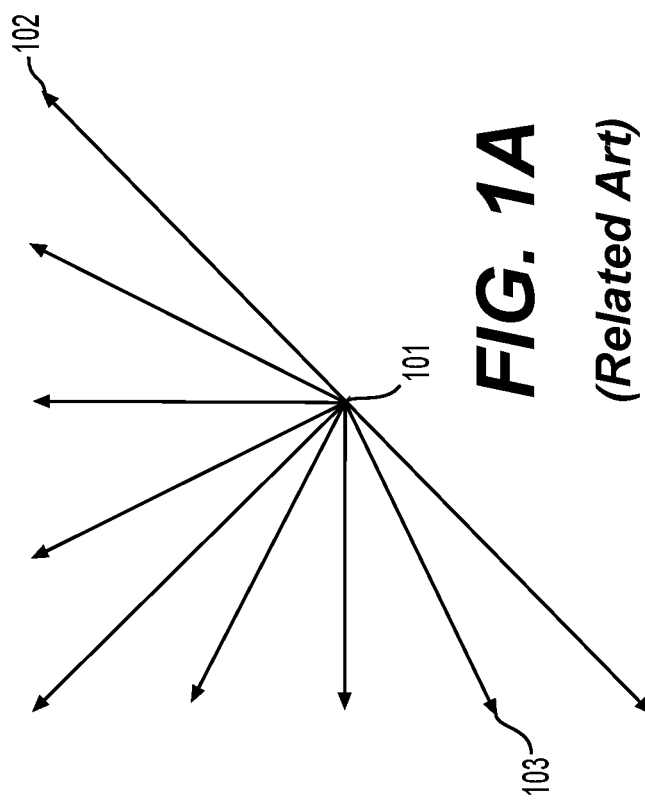
FIG. 1A is a schematic illustration of an exemplary subset of intra prediction modes.
Figure 1B:
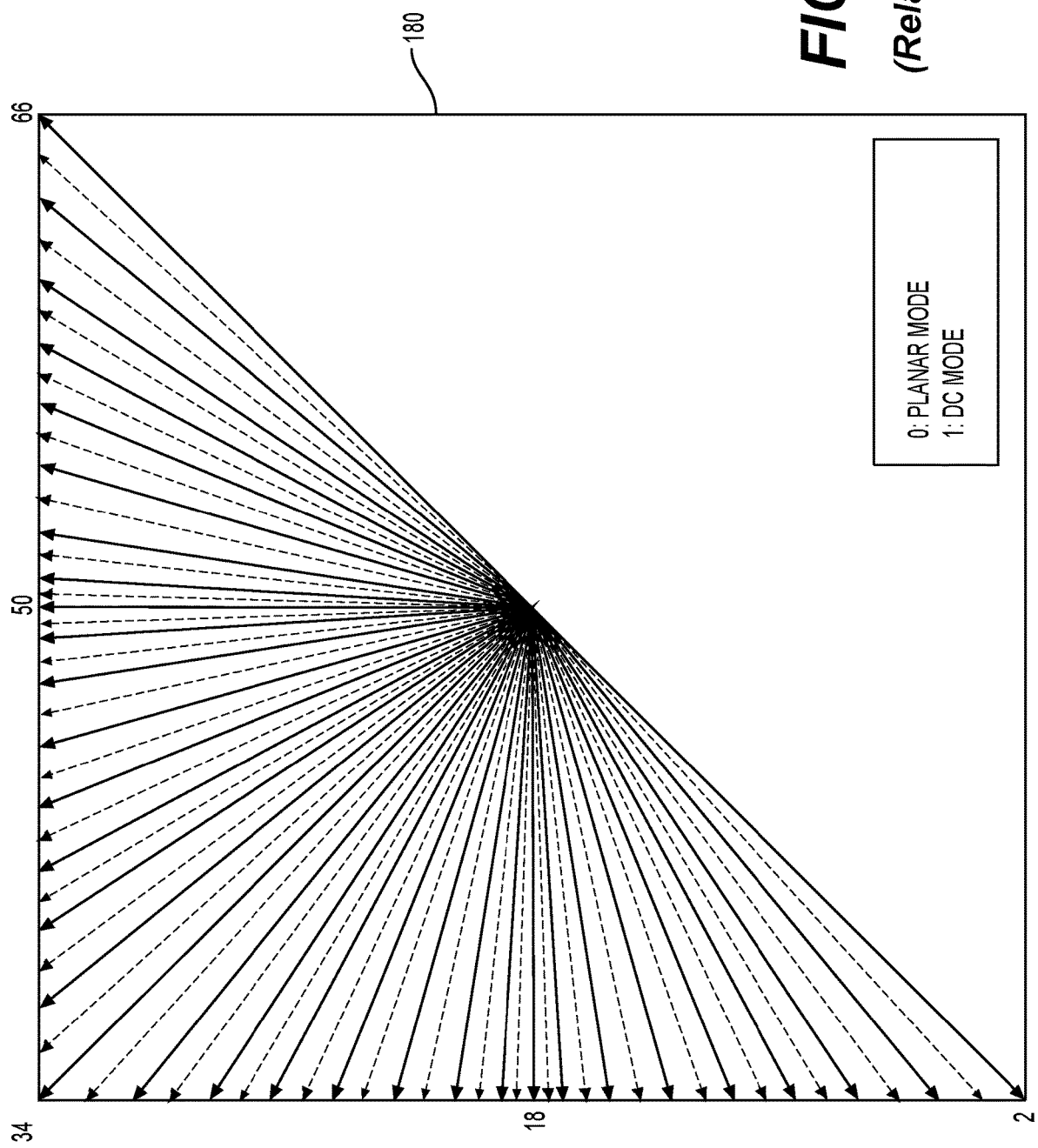
FIG. 1B is an illustration of exemplary intra prediction directions.
Figure 2:
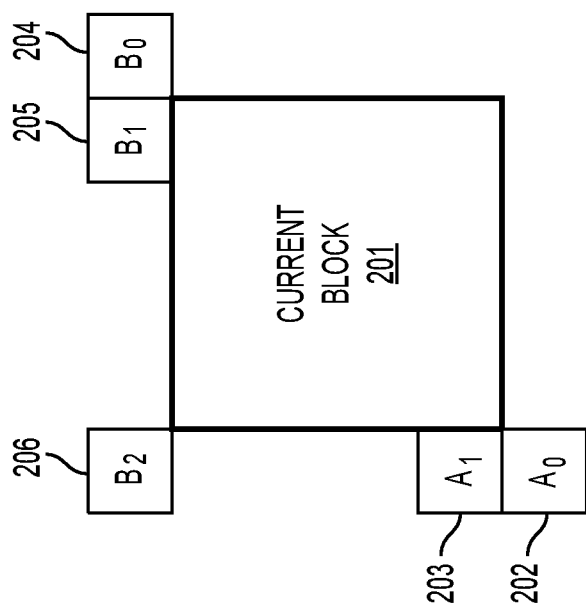
FIG. 2 is a schematic illustration of a current block and its surrounding spatial merge candidates in one example.
Figure 3:
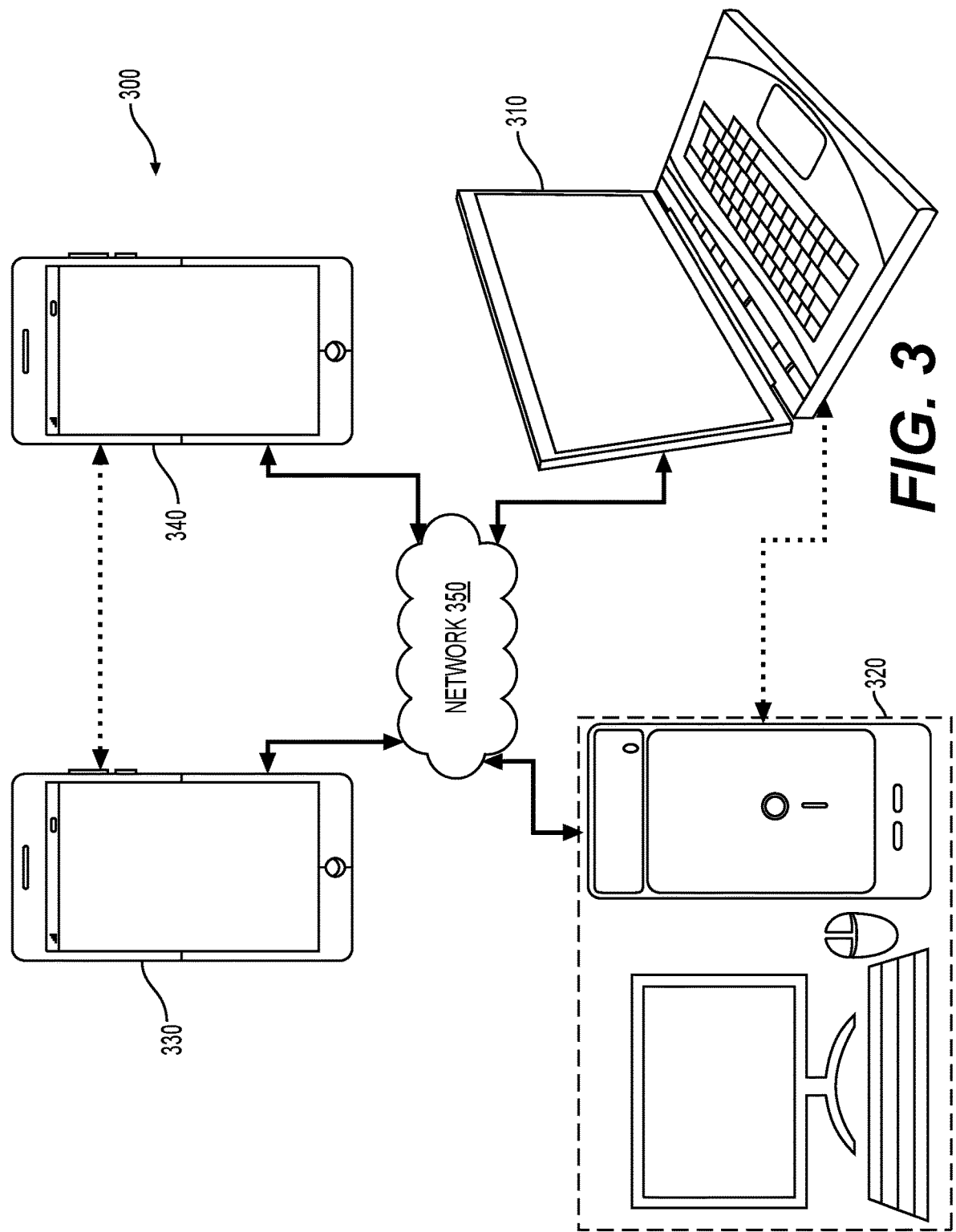
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
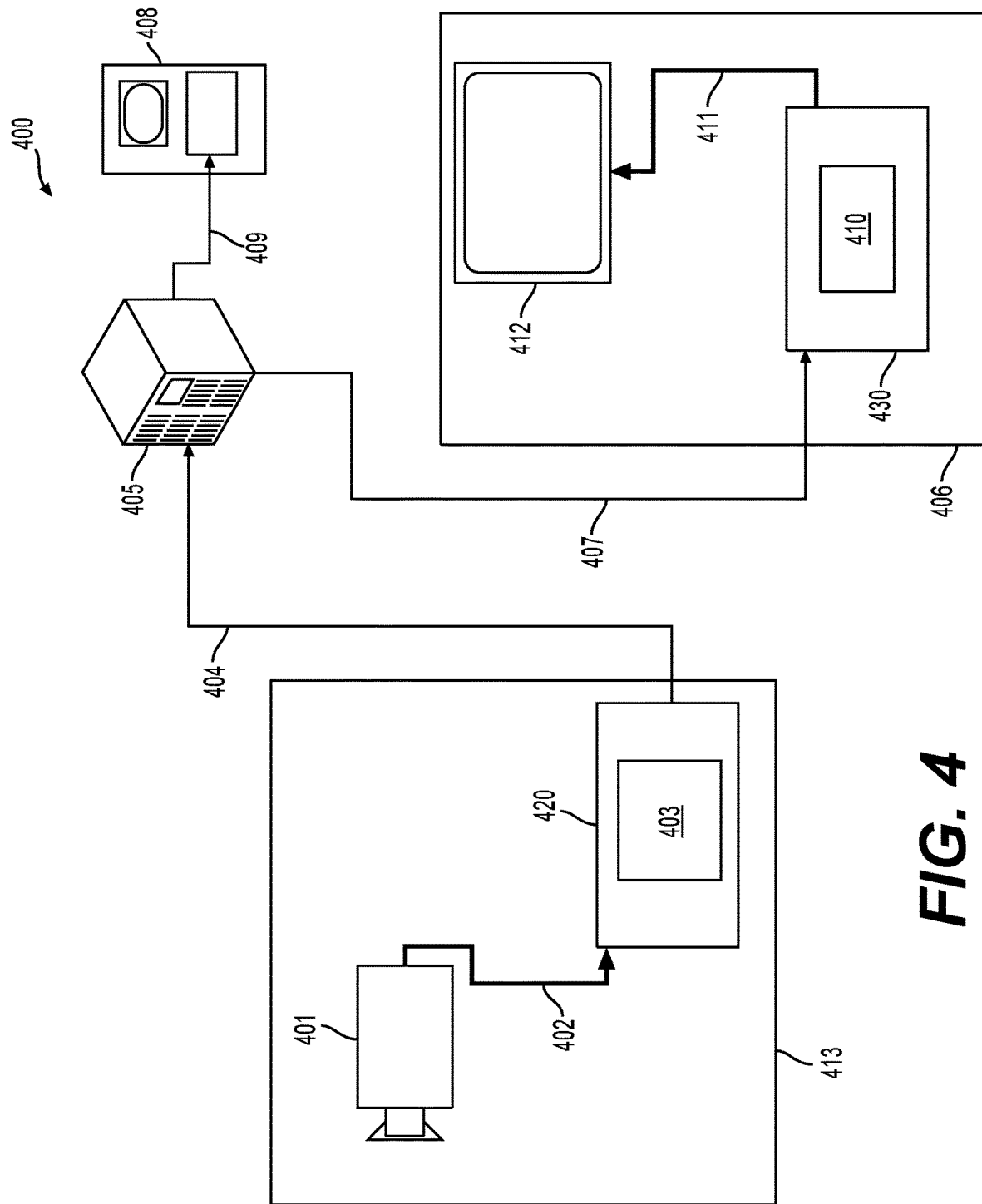
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
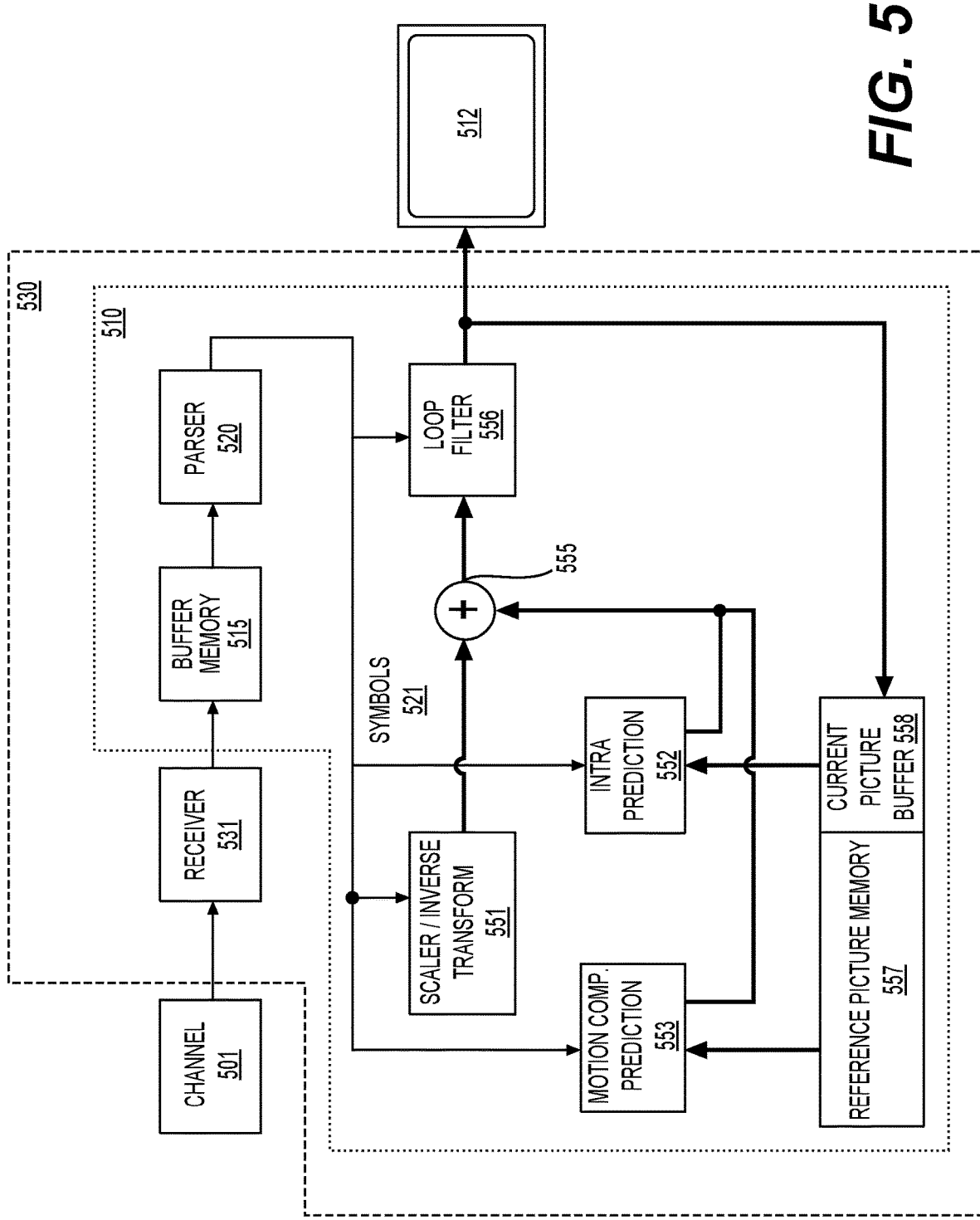
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
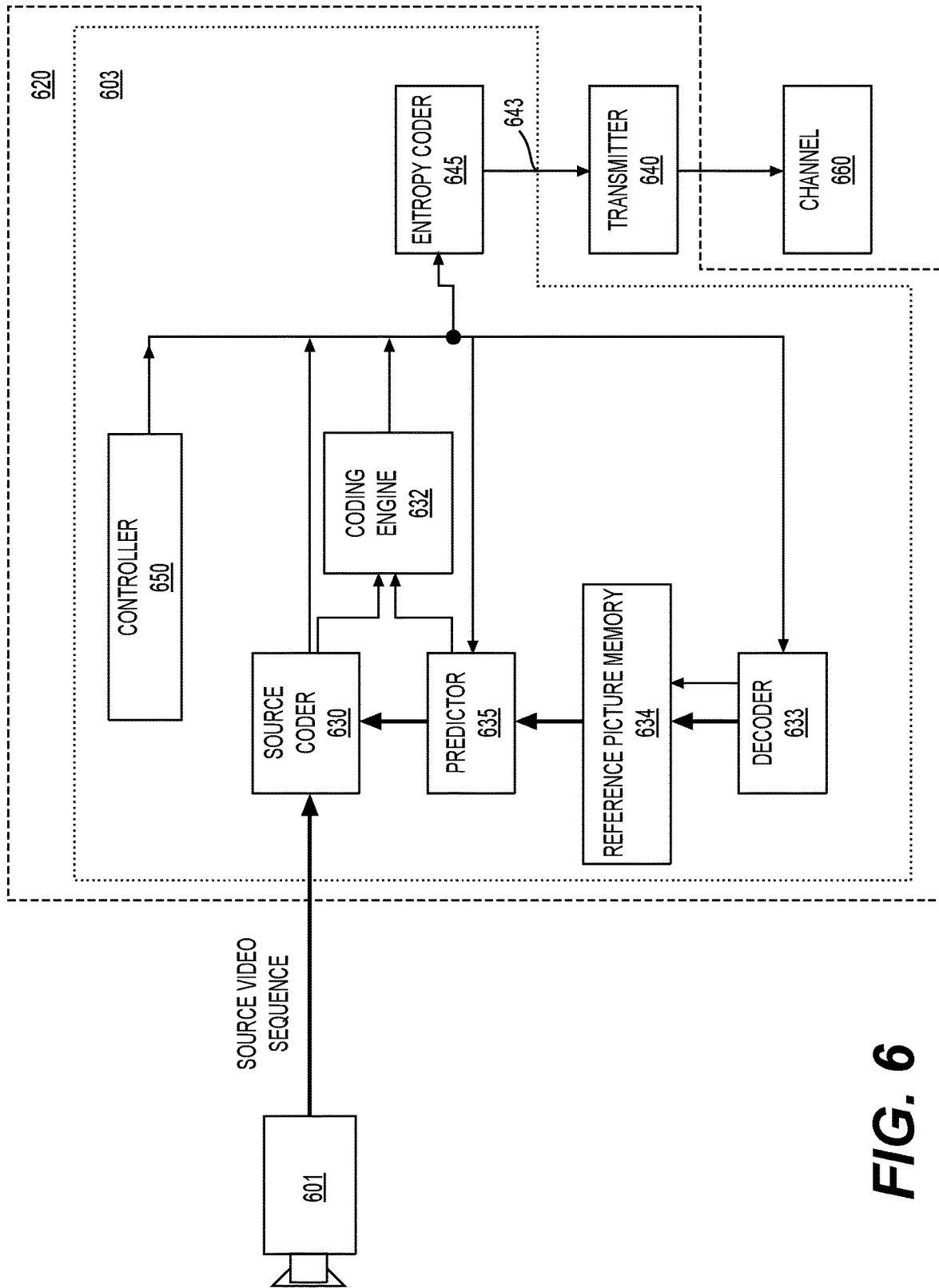
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
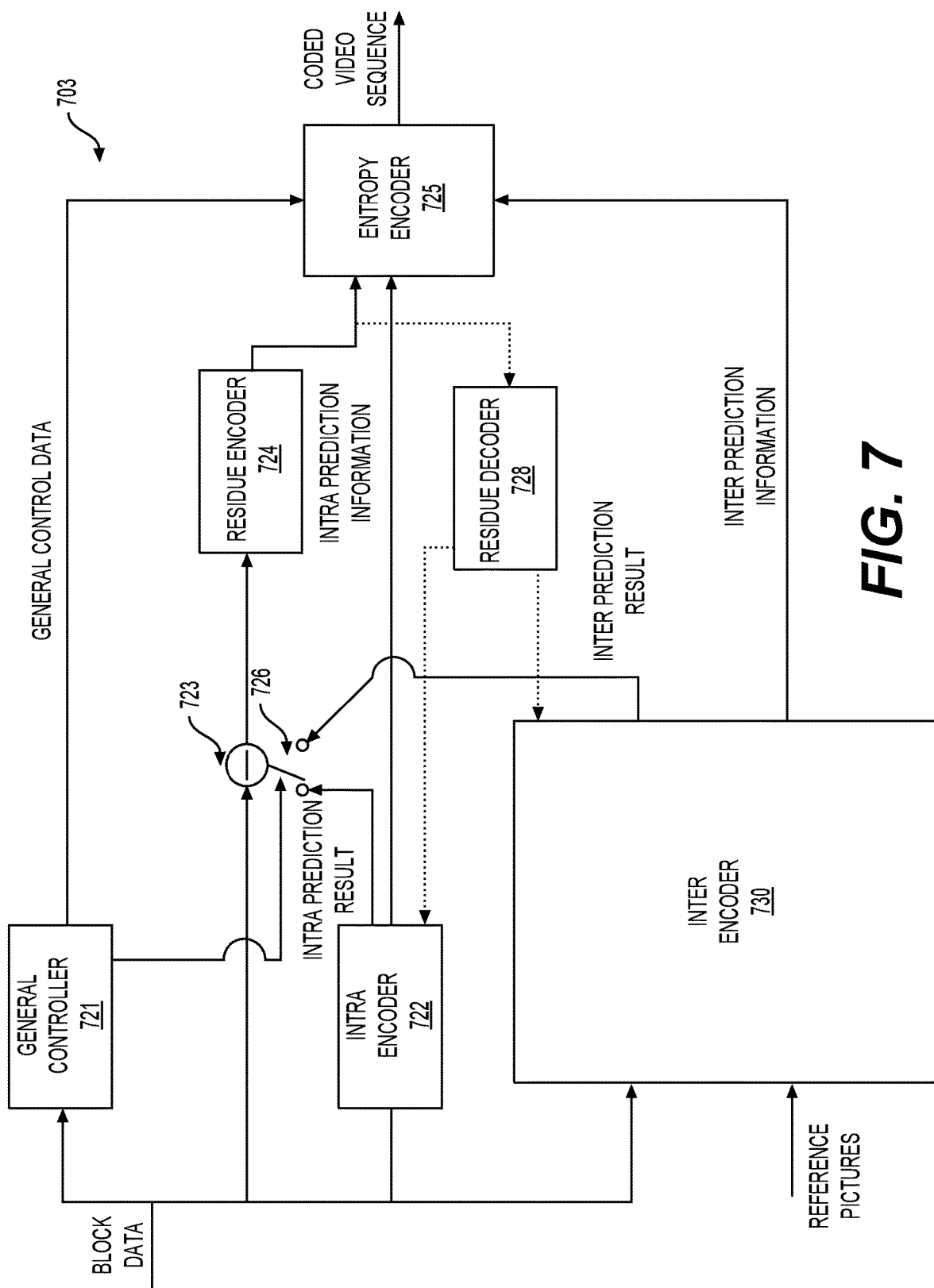
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
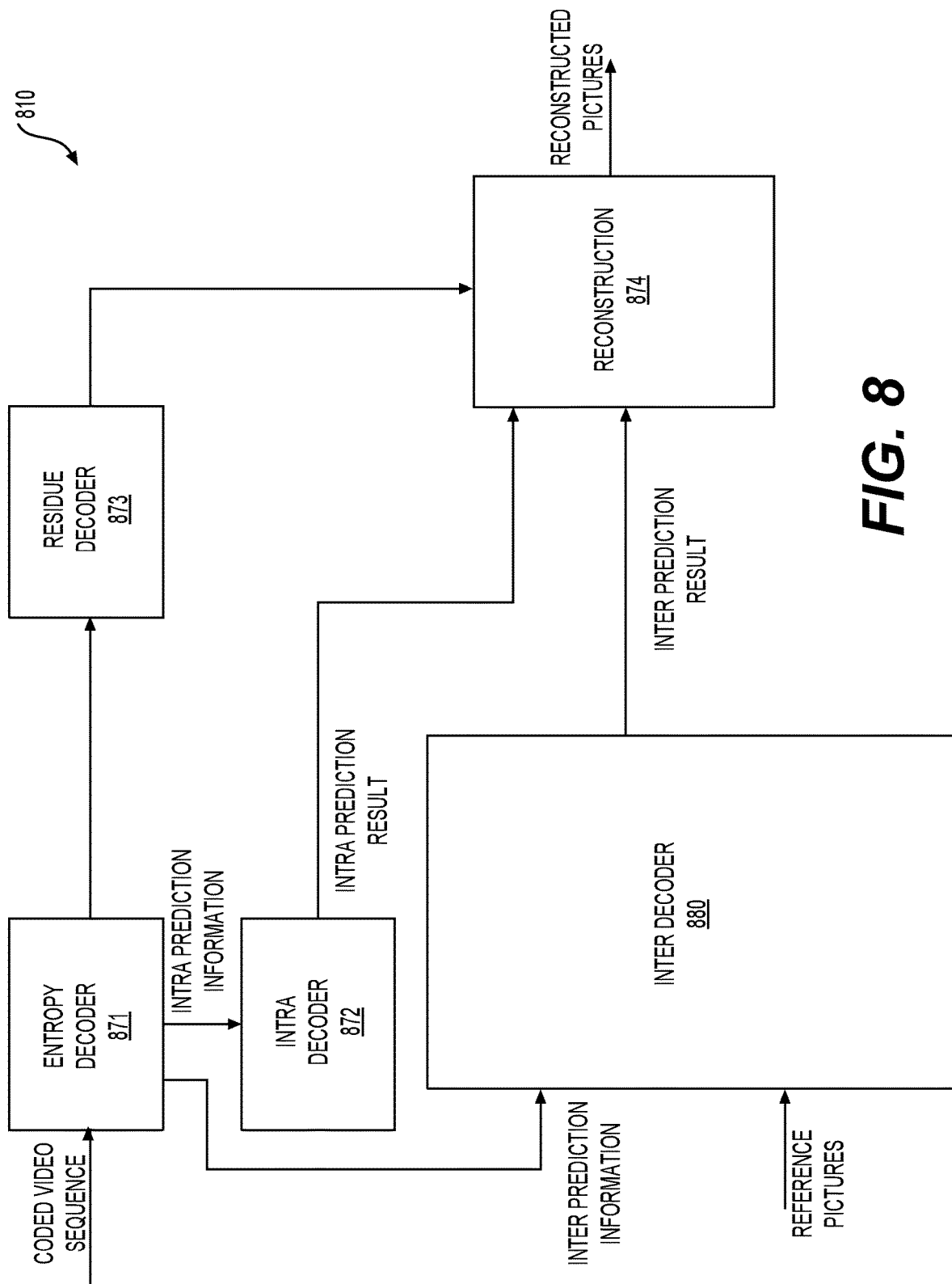
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure include a quantizer for one-dimensional (1D) transform skip. The disclosure is related to a set of video coding technologies designed for efficient compression of video data including design(s) of quantizers for 1D transform skip, such as used in AOMedia Video 2 (AV2). In an example, such as AV2, 8-bit and/or 10-bit transform cores can be utilized.

Embodiments of primary transforms, such as those used in AOMedia Video 1 (AV1), are described below. In order to support extended coding block partitions, multiple transform sizes (e.g., ranging from 4-point to 64-point for each dimension) and transform shapes (e.g., square, a rectangular shape with a width over a height ratio of 2:1, 1:2, 4:1, or 1:4) can be used, such as in AV1.

A 2D transform process can use hybrid transform kernels that can include a different 1D transform for each dimension of a coded residual block. Primary 1D transforms can include a) a 4-point, an 8-point, a 16-point, a 32-point, a 64-point DCT-2; b) a 4-point, an 8-point, a 16-point asymmetric DST (ADST) (e.g., a DST-4, a DST-7) and corresponding flipped versions; and/or c) a 4-point, an 8-point, a 16-point, a 32-point identity transform (IDX). FIG. 9 shows examples of primary transform basis functions according to embodiments of the disclosure. The primary transform basis functions in the FIG. 9 example include basis functions for the DCT-2 and the asymmetric DSTs (DST-4 and DST-7) having an N-point input. The primary transform basis functions shown in FIG. 9 can be used in AV1.

The availability of hybrid transform kernels can be dependent on a transform block size and a prediction mode. FIG. 10A shows exemplary dependencies of the availability of various transform kernels (e.g., transform types shown in the first column and described in the second column) on the transform block size (e.g., sizes shown in the third column) and the prediction mode (e.g., the intra prediction and the inter prediction shown in the third column). The exemplary hybrid transform kernels and the availability based on the prediction modes and transform block sizes can be used in AV1. Referring to FIG. 10A, symbols "→" and "↓" denote a horizontal dimension (also referred to as a horizontal direction) and a vertical dimension (also referred to as a vertical direction), respectively. Symbols "✓" and "x" denote the availability of a transform kernel for the corresponding block size and the prediction mode. For example, the symbol "✓" denotes that the transform kernel is available, and the symbol "x" denotes that the transform kernel is unavailable.

In an example, a transform type (1010) is denoted by ADST_DCT as shown in the first column of FIG. 10A. The transform type (1010) includes an ADST in the vertical direction and a DCT in the horizontal direction as shown in the second column of FIG. 10A. According to the third column of FIG. 10A, the transform type (1010) is available for the intra prediction and the inter prediction when the block size is less than or equal to 16×16 (e.g., 16×16 samples, 16×16 luma samples).

In an example, a transform type (1020) is denoted by V_ADST as shown in the first column of FIG. 10A. The transform type (1020) includes an ADST in the vertical direction and an IDTX (i.e., an identity matrix) in the horizontal direction as shown in the second column of FIG.

10A. Thus, the transform type (1020) (e.g., V_ADST) is performed in the vertical direction and is not performed in the horizontal direction. According to the third column of FIG. 10A, the transform type (1020) is not available for the intra prediction regardless of the block size. The transform type (1020) is available for the inter prediction when the block size is less than 16×16 (e.g., 16×16 samples, 16×16 luma samples).

In an example, FIG. 10A is for a luma component. For a chroma component, a transform type (or a transform kernel) selection can be performed implicitly. In an example, for intra prediction residuals, the transform type can be selected according to an intra prediction mode, as shown in FIG. 10B. For inter prediction residuals, the transform type can be selected according to the transform type selection of a co-located luma block. Therefore, in an example, a transform type for the chroma component is not signaled in a bitstream.

Line graph transforms (LGT) can be used in transforms such as a primary transform, for example, in AV2. In an example, LGTs include various DCTs, discrete sine transforms (DSTs), as described below. LGTs can include 32-point and 64-point 1-dimensional (1D) DSTs.

Graphs are generic mathematical structures including sets of vertices and edges that can be used for modelling affinity relations between objects of interest. Weighted graphs where a set of weights are assigned to edges and optionally to vertices can provide sparse representations for robust modeling of signals/data. LGTs can improve coding efficiency by providing a better adaptation for diverse block statistics. Separable LGTs can be designed and optimized by learning line graphs from data to model underlying row and column-wise statistics of residual signals of a block, and associated generalized graph Laplacian (GGL) matrices can be used to derive the LGTs.

Figures 11, 12:
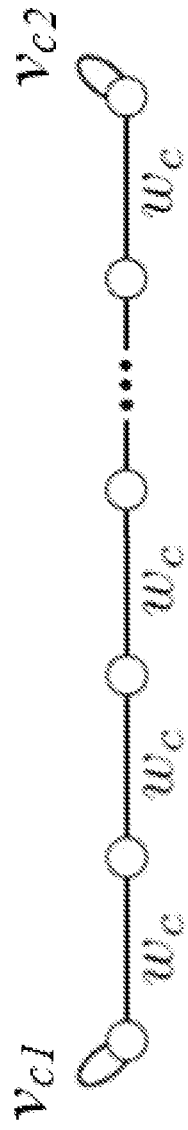
FIG. 11 shows an example of a generic line graph transform (LGT) characterized by self-loop weights and edge weights according to an embodiment of the disclosure.
FIG. 12 shows an exemplary generalized graph Laplacian (GGL) matrix according to an embodiment of the disclosure.

FIG. 11 shows an example of a generic LGT characterized by self-loop weights (e.g., $v_{c1}$, $v_{c2}$) and edge weights $w_c$ according to an embodiment of the disclosure. Given a weighted graph G (W,V), the GGL matrix can be defined as below.

$$L_c = D - W + V \quad \text{(Eq. 1)}$$

where W can be an adjacency matrix including the non-negative edge weights $w_c$, D can be a diagonal degree matrix, and V can be a diagonal matrix denoting the self-loop weights $v_{c1}$ and $v_{c2}$. FIG. 12 shows an example of the matrix $L_c$.

The LGT can be derived by an Eigen-decomposition of the GGL matrix $L_c$ as below.

$$L_c = U \Phi U^T \quad \text{(Eq. 2)}$$

where columns of an orthogonal matrix U can be the basis vectors of the LGT, and $\Phi$ can be a diagonal eigenvalue matrix.

In various examples, certain DCTs and DSTs (e.g., DCT-2, DCT-8 and DST-7), are subsets of a set of LGTs derived from certain forms of the GGLs. The DCT-2 can be derived by setting $v_{c1}$ to 0 (e.g., $v_{c1}=0$). The DST-7 can be derived by setting $v_{c1}$ to $w_c$ (e.g., $v_{c1}=w_c$). The DCT-8 can be derived by setting $v_{c2}$ to $w_c$ (e.g., $v_2=w_c$). The DST-4 can be derived by setting $v_{c1}$ to $2w_c$ (e.g., $v_{c1}=2w_c$). The DCT-4 can be derived by setting $v_{c2}$ to $2w_c$ (e.g., $v_{c2}=2w_c$).

In some examples, such as in AV2, the LGTs can be implemented as matrix multiplications. A 4-point (4p) LGT core can be derived by setting $v_{c1}$ to $2w_c$ in Lc, and thus the 4p LGT core is the DST-4. An 8-point (8p) LGT core can be derived by setting $v_{c1}$ to $1.5w_c$ in Lc. In an example, an LGT core, such as a 16-point (16p) LGT core, a 32-point (32p) LGT core, or a 64-point (64p) LGT core, can be derived by setting $v_{c1}$ to be $w_c$ and $v_{c2}$ to be 0 and the LGT core can become DST-7.

According to aspects of the disclosure, V_DCT can refer to a 1D transform scheme that applies DCT only on the vertical direction, H_DCT can refer to a 1D transform scheme that applies DCT only on the horizontal direction, V_ADST can refer to a 1D transform scheme that applies ADST or any suitable non-DCT transform only on the vertical direction, H_ADST can refer to a 1D transform scheme that applies ADST or any suitable non-DCT transform only on the horizontal direction. Further, V_LGT can refer to a 1D transform scheme that applies LGT only on the vertical direction, H_LGT can refer to a 1D transform scheme that applies LGT only on the horizontal direction, In various embodiments, such as in AV1, quantization of transform coefficients may apply different quantization step sizes (e.g., Qsteps) for DC and AC transform coefficients and/or different Qsteps for luma and chroma transform coefficients. In an example, to specify a quantization step size (e.g., a Qstep), a base quantization syntax element (e.g., an index such as a base_q_idx) is first signaled in a frame header. The base quantization syntax element (e.g., the base_q_idx) can be an 8-bit fixed length code specifying the Qstep for luma AC coefficients. A valid range of the base quantization syntax element (e.g., the base_q_idx) can be [0, 255]. After signaling the base quantization syntax element (e.g., the base_q_idx), a delta value for luma DC coefficients that is relative to the base quantization syntax element (e.g., the base_q_idx) can be further signaled. The delta value for luma DC coefficients can be indicated as a DeltaQYDc.

If there are more than one color plane (also referred to as a color component), a flag (e.g., a diff_uv_delta_flag) can be signaled to indicate whether different quantization index values are applied to color components (e.g., Cb and Cr color components). If the flag (e.g., the diff_uv_delta_flag) is signaled as 0, different color components can have identical quantization index values. Accordingly, only a delta value (e.g., indicated as a DeltaQUDc) relative to the base quantization syntax element (e.g., the base_q_idx) for chroma DC coefficients and a delta value (e.g., indicated as a DeltaQUAc) relative to the base quantization syntax element (e.g., the base_q_idx) for AC coefficients are signaled. Otherwise, if the flag (e.g., the diff_uv_delta_flag) is signaled as being non-zero, delta values including, for example, a delta value (e.g., indicated as DeltaQUDc) for DC coefficients in the Cb chroma component, a delta value (e.g., indicated as DeltaQVDc) for DC coefficients in the Cr chroma component, a delta value (e.g., indicated as DeltaQUAc) for AC coefficients in the Cb chroma component, and a delta value (e.g., indicated as DeltaQVAc) for AC coefficients in the Cr chroma component, that are relative to the base quantization syntax element (e.g., the base_q_idx) are signaled.

One or more of the above decoded delta values (e.g., DeltaQYDc, DeltaQUAc, DeltaQUDc, DeltaQVAc and DeltaQVDc) can be added to the base quantization syntax element (e.g., the base_q_idx) to derive quantization indices (e.g., Q_indices). The quantization indices (e.g., Q_indices) can be further mapped to Qsteps according to a mapping relationship between the quantization indices (e.g., Q_indices) and the Qsteps. In an example, the mapping relationship is represented by a table (e.g., a lookup table), a graph, or the like. A mapping relationship for DC coefficients can be different from a mapping relationship for AC coefficients.

In general, the mapping from the quantization index to Qstep can be for N1 internal bit depths and for N2 quantization indices where N1 and N2 are positive integers. Thus, the mapping relationship can be specified by a lookup table (e.g., Dc_Qlookup[N1][N2] for DC coefficients and Ac_Qlookup[N1][N2] for AC coefficients).

Figure 13:
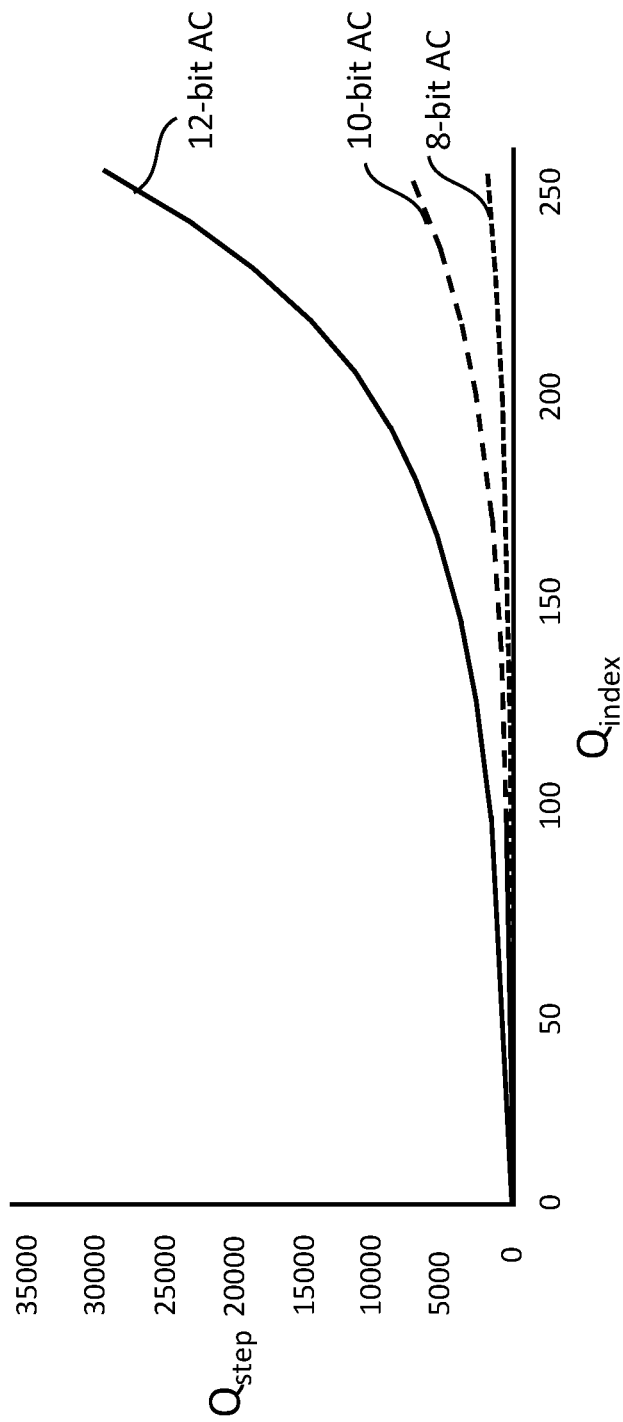
FIG. 13 shows an exemplary mapping relationship between a quantization index and a quantization step according to an embodiment of the disclosure.

FIG. 13 shows an exemplary mapping relationship between a quantization index (e.g., a Q_index) and a Qstep for DC coefficients according to an embodiment of the disclosure. In an example shown in FIG. 13, N1 is 3 and N2 is 256, and thus the mapping from the quantization index to Qstep is for three internal bit depths (e.g., 8-bit, 10-bit and 12-bit) and for 256 quantization indices. Accordingly, the mapping relationship can be specified by one or more lookup tables (e.g., Dc_Qlookup[3][256]). In an example, the lookup tables Dc_Qlookup[3][256] include three tables, each of which include 256 entries or values.

Figure 14:
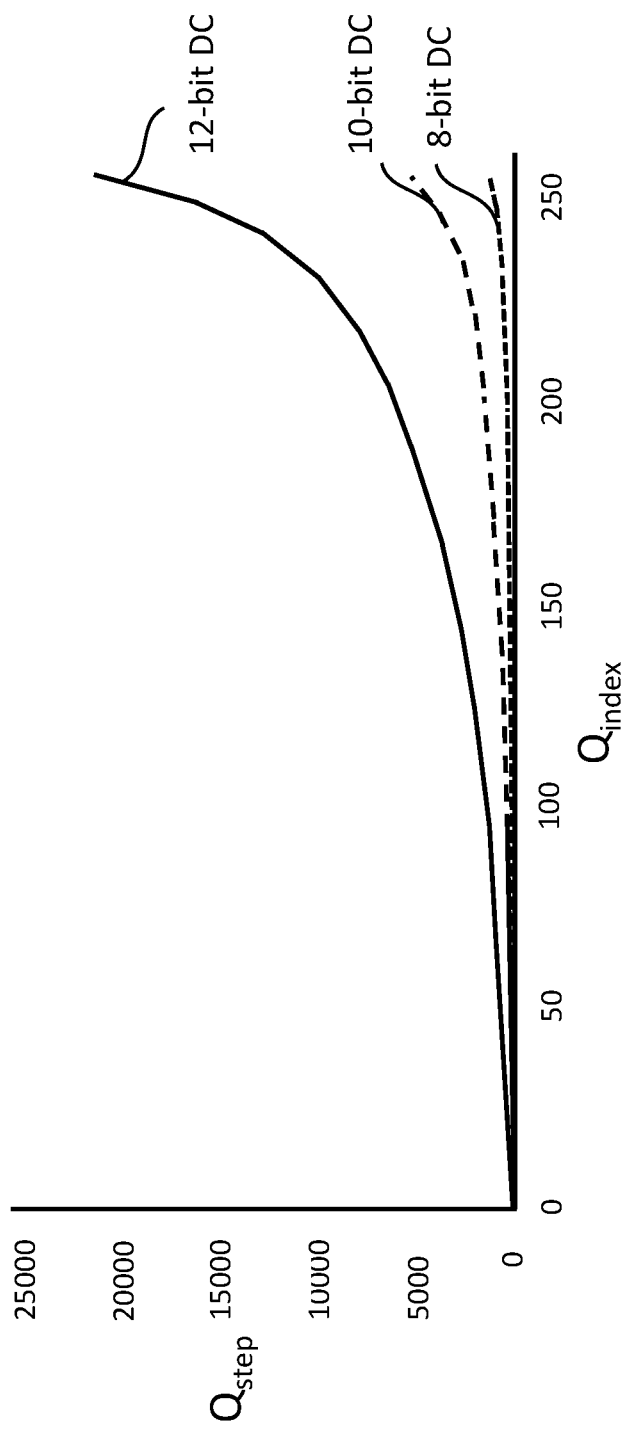
FIG. 14 shows an exemplary mapping relationship between a quantization index and a quantization step according to an embodiment of the disclosure.

FIG. 14 shows an exemplary mapping relationship between a quantization index (e.g., a Q_index) and a Qstep for AC coefficients according to an embodiment of the disclosure. In an example shown in FIG. 14, N1 is 3 and N2 is 256, and thus the mapping from the quantization index to Qstep is for three internal bit depths (e.g., 8-bit, 10-bit and 12-bit) and for 256 quantization indices. Accordingly, the mapping relationship can be specified by one or more lookup tables (e.g., Ac_Qlookup[3][256]). In an example, the lookup tables Ac_Qlookup[3][256] include three tables, each of which include 256 entries or values.

One or more quantization matrices (denoted as QMatrix, such as wt_matrix_ref and iwt_matrix_ref) can be used for adaptive quantization of different transform coefficient bands. In an example, a transform coefficient band includes transform coefficients within a spatial frequency range. Depending on a transform block (TB) size, the quantization matrices can specify values of a scaling factor applied to different transform coefficients. Thus, a final Qstep can be defined based on an initial Qstep and the scaling factor. In an example, the final Qstep ($Qstep_f$) is defined based on the initial Qstep ($Qstep_i$) and the scaling factor as below:

$$Qstep_f = (Qstep_i * \text{scaling factor} + 16)/32 \quad \text{(Eq. 3)}$$

Figure 15:
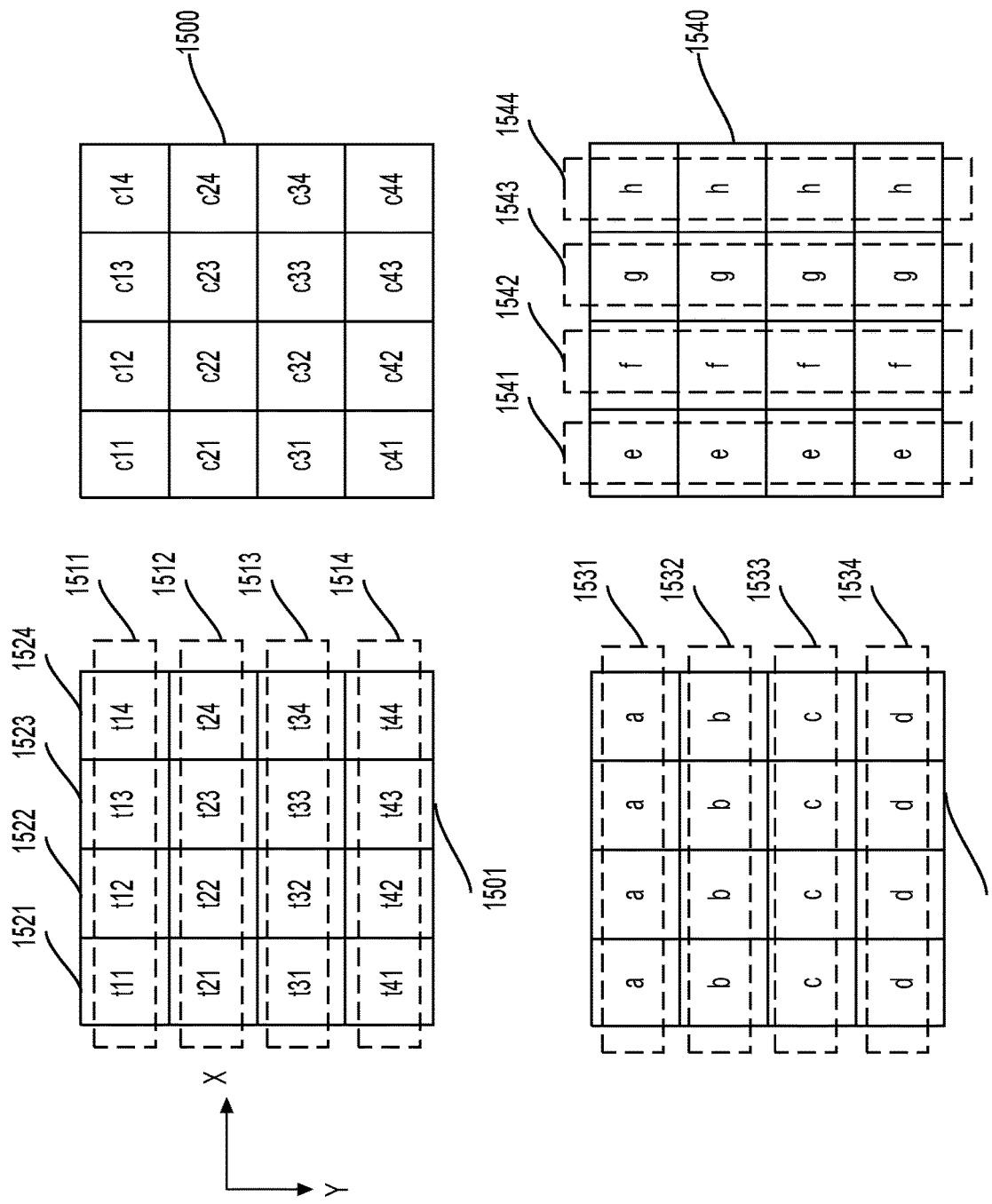
FIG. 15 shows an exemplary transform block and exemplary quantization matrices according to embodiments of the disclosure.

FIG. 15 shows an example of a quantization matrix (QMatrix) (1500) according to an embodiment of the disclosure. The quantization matrix (QMatrix) (1500) includes a plurality of scaling factors c11-c14, c21-c24, c31-c34, and c41-c44 that can be used to determine the final Qsteps.

One or more quantization matrices can be specified for the transform coefficients (e.g., Y, U, and V transform coefficients). Referring to FIG. 15, in an example, the QMatrix (1500) is specified for transform coefficients (e.g., t11-t14, t21-t24, t31-t34, and t41-t44) in a TB (1501). A dimension, such as a width and a height, of the QMatrix (1500) can be identical to a dimension, such as a width and a height, of the TB (1501). One of the one or more quantization matrices can be indicated by a Qmatrix index. In an embodiment, up to 15 quantization matrices (QMatrices) are specified for the Y, U, and V transform coefficients. A Qmatrix index (e.g., an integer in a range of 0 to 14) can indicate a flatness of the scaling factor in one of the 15 quantization matrices (QMatrices).

The quantization process described with reference to FIGS. 13 and 14 can be suitably adapted. In an embodiment, such as in AV2, the separate lookup tables (e.g., the six lookup tables Dc_Qlookup[3][256] and the Ac_Qlookup[3] [256]) shown in FIGS. 13 and 14 can be replaced with a unified lookup table. The multiple lookup tables, for example, used in the AV1 quantization process, can be consolidated into a single lookup table. Thus, the mapping relationship between Qindex and Qstep (e.g., the mapping from Qindex to Qstep) can be defined using an exponential function instead of a mapping table (or a lookup table). In addition, the Qstep values defined for a 10 bit video and/or a 12 bit video can be derived from a lookup table defined for an 8 bit video.

In an embodiment, such as in AV1, transform coefficients in a block (e.g., a TB) are quantized and/or de-quantized using separate Qstep values for a DC transform coefficient (e.g., the first transform coefficient in the block such as t11 in the TB (1501)) and AC transform coefficients (e.g., remaining transform coefficients in the block such as t12-t14, t21-t24, t31-t34, and t41-t44 in the TB (1501)). The Qstep used for the DC transform coefficient in the block can be referred to as a DC Qstep ($Qstep_{DC}$), and the Qstep used for the AC transform coefficients in the block can be referred to as an AC Qstep ($Qstep_{AC}$). In an example, the DC Qstep ($Qstep_{DC}$) is smaller than the AC Qstep ($Qstep_{AC}$).

In some examples, if enabled, a scaling factor (e.g., c11 in FIG. 15) can be applied to each transform coefficient (e.g., t11 in FIG. 15) as described by quantization matrices (QMatrix, such as wt_matrix_ref and iwt_matrix_ref). If a transform type used for a block (e.g., a coding bloc, a transform block TB) includes a transform skip (e.g., an identity transform) in the horizontal dimension and/or the vertical dimension, the QMatrix (if enabled) can be chosen to be a flat matrix (e.g., no weighting). In an example, if the transform type used for the block includes a transform skip in both the horizontal dimension and the vertical dimension, the transform matrix is an identity matrix (or the IDTX), and thus no transform is applied to the block.

In an example, the transform type used for the block includes a transform skip in the horizontal dimension but not the vertical dimension, and thus the transform type is performed in the vertical direction and is not performed in the horizontal direction. The transform type can include V_DCT, V_ADST, V_FLIPADST, and/or the like. The above scheme can have the following issue. Referring to FIG. 15, in one example, a first row (e.g., a row (1511)) of transform coefficients (e.g., t11-t14) in a block using transform types such as V_DCT, V_ADST, V_FLIPADST, or the like are DC coefficients and subsequent rows (e.g., rows (1512)-(1514)) in the block are AC coefficients with row-wise increasing sinusoidal frequencies. Thus, using the DC Qstep ($Qstep_{DC}$) on only the first coefficient (e.g., t11) in the block and the AC Qstep ($Qstep_{AC}$) for the subsequent coefficients (e.g., t12-t14, t21-t24, t31-t34, and t41-t44) in the block can be suboptimal because the entire first row (e.g., the row (1511)) in the block includes DC coefficients, and thus it is important to have a more accurate quantization/de-quantization for the first row. According, it is more advantageous to quantize or de-quantize the first row with a smaller Qstep (e.g., $Qstep_{DC}$). Further, the QMatrix (if enabled) is flat over the entire range, for example, elements in the QMatrix have a same value.

In an example, the transform type used for the block includes a transform skip in the vertical dimension but not the horizontal dimension, and thus the transform type is performed in the horizontal direction and is not performed in the vertical direction. The transform type can include H_DCT, H_ADST, H_FLIPADST, and/or the like. The above scheme can have the following issue. Referring to FIG. 15, in an example, a first column (e.g., a column (1521)) of transform coefficients (e.g., t11, t21, t31, and t41) in the block (e.g., the TB (1501)) using transform types such as H_DCT, H_ADST, H_FLIPADST, or the like are DC coefficients and subsequent columns (e.g., columns (1522)-(1524)) in the block are AC coefficients with column-wise increasing sinusoidal frequencies. Referring to FIG. 15, the column (1522) includes the transform coefficients t12, t22, t32, and t42, the column (1523) includes the transform coefficients t13, t23, t33, and t43, and the column (1524) includes the transform coefficients t14, t24, t34, and t44. Thus, using the DC Qstep ($Qstep_{DC}$) on only the first coefficient (e.g., t11) in the block and the AC Qstep ($Qstep_{AC}$) for the subsequent coefficients (e.g., t12-t14, t21-t24, t31-t34, and t41-t44) in the block can be suboptimal because the entire first column (e.g., the row (1521)) in the block include DC coefficients, and thus it is important to have a more accurate quantization/de-quantization for the first column. According, it is more advantageous to quantize or de-quantize the first column with a smaller Qstep (e.g., $Qstep_{DC}$). Further, the QMatrix (if enabled) is flat over the entire range, for example, elements in the QMatrix have a same value.

A 1D transform skip can refer to a transform skip in one dimension (e.g., the horizontal dimension or the vertical dimension), and thus a transform with the 1D transform skip is performed on one dimension of a block. A 1D transform can refer to a transform that is only applied to one dimension of the block where the transform includes the 1D transform skip. A 1D transform can refer to a 1D horizontal transform or a 1D vertical transform. The 1D horizontal transform can refer to a transform that is only applied to the horizontal dimension of the block where the transform includes the 1D transform skip in the vertical dimension. The 1D vertical transform can refer to a transform that is only applied to the vertical dimension of the block where the transform includes the 1D transform skip in the horizontal dimension.

A 2D transform skip can refer to a transform skip in two dimensions (e.g., the horizontal dimension and the vertical dimension), and thus there is no transform on the block and the transform matrix is an identity matrix. In an example, for a block using the 2D transform skip, only one quantization step (e.g., a Qstep) is used for the block. When there is no transform skip, a transform can be performed on two dimensions on the block.

Referring to FIG. 15, in an example, the TB (1501) is transformed using a 2D transform without transform skip. Accordingly, the first transform coefficient t11 is a DC transform coefficient, and thus is quantized or de-quantized with the DC step ($Qstep_{DC}$) and remaining transform coefficients or the AC transform coefficients in the TB (1501) are quantized or de-quantized with the AC step ($Qstep_{AC}$). In an example, the DC step ($Qstep_{DC}$) is smaller than the AC step ($Qstep_{AC}$), and thus the DC coefficient is quantized and/or de-quantized more accurately than the AC transform coefficients.

According to aspects of the disclosure, a different quantization process and/or a de-quantization process can be used for a block (e.g., a TB, a CB, a PB, a luma block, a chroma block, a luma TB, a chroma TB, or the like) that is transformed with the 1D transform skip compared to a quantization process and/or a de-quantization process for a block that is transformed with the 2D transform skip or without transform skip, as described above. Referring back to FIG. 15, in an example, the TB (1501) is transformed with the 1D transform skip. For example, the TB (1501) is transformed with the 1D transform skip in the vertical dimension or the horizontal dimension. Accordingly, in addition to the first transform coefficient (e.g., t11), remaining transform coefficients in the first column (1521) or the first row (1511) can be DC transform coefficients. In general, the DC transform coefficient(s) can be more important than the AC transform coefficients, and thus can be quantized or de-quantized more accurately (e.g., using a smaller quantization step). Therefore, instead of quantizing or de-quantizing the first transform coefficient (e.g., t11) alone with the DC step ($Qstep_{DC}$), the DC transform coefficients in the first column (1521) or the first row (1511) can be quantized and/or de-quantized using the same DC step ($Qstep_{DC}$).

According to aspects of the disclosure, coding information of a block (e.g., a TB) can be decoded from a coded video bitstream. In an example, the block is a luma block. In an example, the block is a chroma block. The coding information can indicate a transform skip (a 1D transform skip) in one direction (also referred to as a skip direction) for the block. Transform coefficients in the block can be de-quantized based on a plurality of quantization steps. In an example, the plurality of quantization steps includes two quantization steps, such as the DC step ($Qstep_{DC}$) and the AC step ($Qstep_{AC}$). However, more than two quantization steps can be used in other examples. First transform coefficients in the block can be de-quantized based on a smallest of the plurality of quantization steps. The first transform coefficients in the block can include one of a first row and a first column of the transform coefficients in the block that has a DC spatial frequency. The one of the first row and the first column can be along the one direction of the transform skip. Further, an inverse transform can be performed on the de-quantized transform coefficients in the block.

The one direction can be the horizontal direction or the vertical direction. If the one direction is the horizontal direction, the first transform coefficients in the block include a first row of the transform coefficients in the block that has a DC spatial frequency where the first row of the transform coefficients are DC transform coefficients.

If the one direction is the vertical direction, the first transform coefficients in the block include a first column of the transform coefficients in the block that has the DC spatial frequency where the first column of the transform coefficients are DC transform coefficients.

In an example, the plurality of quantization steps includes the DC step ($Qstep_{DC}$) and the AC step ($Qstep_{AC}$), and the smallest of the plurality of quantization steps is the DC step ($Qstep_{DC}$).

In an example, a height (or a block height) and a width (or a block width) of the block are $2^N$ and $2^M$ samples, respectively where N and M can be integers larger than 1.

In an embodiment, the one direction is the horizontal direction. The transform type of the block is the 1D vertical transform. The one of the first row and the first column is the first row of the transform coefficients in the block. The first row of the transform coefficients in the block can be de-quantized based on the smallest (e.g., the DC step ($Qstep_{DC}$)) of the plurality of quantization steps. Remaining rows of the transform coefficients in the block can be de-quantized based on another one (e.g., the AC step ($Qstep_{AC}$)) of the plurality of quantization steps.

According to aspects of the disclosure, if the transform type of the block is the 1D vertical transform, such as V_LGT, V_DCT, V_ADST, V_FLIPADST, or the like, the DC step ($Qstep_{DC}$) can be applied to quantize or de-quantize transform coefficients (or DC transform coefficients) of the first row in the block. The AC step ($Qstep_{AC}$) can be applied to quantize or de-quantize transform coefficients (or AC transform coefficients) of remaining row(s) in the block. Referring to FIG. 15, the TB (1501) is obtained by the 1D vertical transform. Thus, transform coefficients t11-t14 in the first row (1511) are DC transform coefficients, and transform coefficients in remaining rows (1512)-(1514) are AC transform coefficients. Accordingly, the DC step ($Qstep_{DC}$) can be applied to the transform coefficients t11-t14 of the first row (1511) in the TB (1501). The AC step ($Qstep_{AC}$) can be applied to the transform coefficients t21-t24, t31-t34, and t41-t44 of the remaining rows (1512)-(1514) in the TB (1501).

In an embodiment, the one direction is the horizontal direction. The one of the first row and the first column is the first row of the transform coefficients in the block. The transform type of the block is the 1D vertical transform. The first row and one or more additional rows of the transform coefficients in the block that are adjacent to the first row can be de-quantized based on the smallest (e.g., the DC step ($Qstep_{DC}$)) of the plurality of quantization steps. The first transform coefficients in the block can further include the one or more additional rows of the transform coefficients in the block. Remaining rows of the transform coefficients in the block can be de-quantized based on another one (e.g., the AC step ($Qstep_{AC}$)) of the plurality of quantization steps.

In an embodiment, the transform type of the block is the 1D vertical transform, such as V_LGT, V_DCT, V_ADST, V_FLIPADST, or the like. In addition to the DC transform coefficients in the first row of the block, AC transform coefficients in one or more rows that are adjacent to the first row are also important, and are quantized and/or de-quantized with a smaller quantization step than remaining AC transform coefficients of remaining row(s) in the block. Accordingly, the DC step ($Qstep_{DC}$) can be applied to transform coefficients of the first row and the one or more rows that are adjacent to the first row in the block. The AC step ($Qstep_{AC}$) can be applied to the remaining AC transform coefficients of the remaining row(s) in the block. Referring to FIG. 15, the TB (1501) is obtained by the 1D vertical transform. Thus, the transform coefficients t11-t14 in the first row (1511) are DC transform coefficients, and the transform coefficients in the remaining rows (1512)-(1514) are AC transform coefficients. In an example, the one or more rows that are adjacent to the first row include the row (1512). Accordingly, the DC step ($Qstep_{DC}$) can be applied to the transform coefficients t11-t14 of the first row (1511) and the transform coefficients t21-t24 of the row (1512). The AC step ($Qstep_{AC}$) can be applied to the remaining AC transform coefficients t31-t34 and t41-t44 of the remaining rows (1513)-(1514) in the TB (1501).

In an embodiment, the one direction is the vertical direction. The transform type of the block is the 1D horizontal transform. The one of the first row and the first column is the first column of the transform coefficients in the block. The first column of the transform coefficients in the block can be de-quantized based on the smallest (e.g., the DC step ($Qstep_{DC}$)) of the plurality of quantization steps. Remaining columns of the transform coefficients in the block can be de-quantized based on another one (e.g., the AC step ($Qstep_{AC}$)) of the plurality of quantization steps.

According to aspects of the disclosure, if the transform type of the block is the 1D horizontal transform, such as H_LGT, H_DCT, H_ADST, H_FLIPADST, or the like, the DC step ($Qstep_{DC}$) can be applied to transform coefficients (or DC transform coefficients) of the first column in the block. The AC step ($Qstep_{AC}$) can be applied to transform coefficients (or AC transform coefficients) of remaining column(s) in the block. Referring to FIG. 15, the TB (1501) is obtained by the 1D horizontal transform. Thus, transform coefficients t11, t21, t31, and t41 in the first column (1521) are DC transform coefficients, and transform coefficients in remaining columns (1522)-(1524) are AC transform coefficients. Accordingly, the DC step ($Qstep_{DC}$) can be applied to the transform coefficients t11, t21, t31, and t41 in the first column (1521) in the TB (1501). The AC step ($Qstep_{AC}$) can be applied to the transform coefficients t12-t14, t22-t24, t32-t34, and t42-t44 of the remaining columns (1522)-(1524) in the TB (1501).

In an embodiment, the one direction is the vertical direction. The one of the first row and the first column is the first column of the transform coefficients in the block. The transform type of the block is the 1D horizontal transform. The first column and one or more additional columns of the transform coefficients in the block that are adjacent to the first column can be de-quantized based on the smallest (e.g., the DC step ($Qstep_{DC}$)) of the plurality of quantization steps. The first transform coefficients in the block can further include the one or more additional columns of the transform coefficients in the block. Remaining columns of the transform coefficients in the block can be de-quantized based on another one (e.g., the AC step ($Qstep_{AC}$)) of the plurality of quantization steps.

In an embodiment, the transform type of the block is the 1D horizontal transform, such as H_LGT, H_DCT, H_ADST, H_FLIPADST, or the like. In addition to the DC transform coefficients in the first column of the block, AC transform coefficients in one or more columns that are adjacent to the first column are also important, and are quantized and/or de-quantized with a smaller quantization step than remaining AC transform coefficients of remaining column(s) in the block. Accordingly, the DC step ($Qstep_{DC}$) can be applied to transform coefficients of the first column and the one or more columns that are adjacent to the first column in the block. The AC step ($Qstep_{AC}$) can be applied to the remaining AC transform coefficients of the remaining column(s) in the block. Referring to FIG. 15, the TB (1501) is obtained by the 1D vertical transform. Thus, the transform coefficients t11, t21, t31, and t41 in the first column (1521) are DC transform coefficients, and the transform coefficients in the remaining columns (1522)-(1524) are AC transform coefficients. In an example, the one or more columns that are adjacent to the first column include the column (1522). Accordingly, the DC step ($Qstep_{DC}$) can be applied to the transform coefficients t11, t21, t31, and t41 of the first column (1521) and the transform coefficients t12, t22, t32, and t42 of the column (1522). The AC step ($Qstep_{AC}$) can be applied to the remaining AC transform coefficients t13, t14, t23, t24, t33, t34, t43, and t44 of the remaining columns (1523)-(1524) in the TB (1501).

According to aspects of the disclosure, signaling information such as a flag (or a control flag) indicating whether to de-quantize the first transform coefficients based on the smallest of the plurality of quantization steps can be decoded from the coding information. If the flag indicates that the first transform coefficients are to be de-quantized based on the smallest of the plurality of quantization steps, the first transform coefficients can be de-quantized based on the smallest of the plurality of quantization steps. In an example, remaining transform coefficients in the block are de-quantized based on another of the plurality of quantization steps.

If the flag indicates that the first transform coefficients are not to be de-quantized based on the smallest of the plurality of quantization steps, one (e.g., a top-left transform coefficient in the block) of the first transform coefficients in the block can be de-quantized based on the smallest of the plurality of quantization steps and remaining transform coefficients in the block can be de-quantized based on another of the plurality of quantization steps.

The flag can be associated with different levels such as one of: the block (e.g., the TB), a plurality of blocks including the block (e.g., the TB), a coding tree block (CTB), and a tile. In an example, the flag is on a block-level. In an example, the flag is signaled for the block, the plurality of blocks including the block, the CTB, the tile, or the like.

The flag can be indicated (e.g., signaled) in a high-level syntax, such as a video parameter set (VPS), a sequence parameter set (SPS), an adaptive parameter set (APS), a picture parameter set (PPS), a slice header, or the like.

According to aspects of the disclosure, the flag (or the control flag) can be used to indicate whether a single quantization step (e.g., the DC step ($Qstep_{DC}$)) is applied to quantize and/or de-quantize a plurality of transform coefficients of at least the first row or at least the first column in the block (e.g., the TB (1501)). In an example, the flag is used to control (e.g., enable or disable) the application of the single quantization step in quantizing and/or de-quantizing the plurality of transform coefficients of at least the first row or at least the first column in the block. The flag can be associated with any suitable level(s), such as a block level (e.g., a TB level, a PB level, or a CTB level), a tile level, and/or the like.

In an embodiment, the flag is written and read only when the transform type of the block is a 1D transform, such as the 1D horizontal transform or the 1D vertical transform. In an embodiment, the flag is written and read only when the transform type is one of at least one pre-defined transform types. In an example, the flag is written and read only when the transform type of the block is one of: V_DCT, H_DCT, V_ADST, H_ADST, V_FLIPADST, and H_FLIPADST.

In an example, when the flag is off, the single quantization step (e.g., the DC step ($Qstep_{DC}$)) is applied to quantize and/or de-quantize the plurality of transform coefficients of at least the first row or at least the first column in the block.

When the flag is on, the single quantization step (e.g., the DC step ($Qstep_{DC}$)) is not applied to quantize and/or de-quantize the plurality of transform coefficients of at least the first row or at least the first column in the block. Instead, the quantization step (e.g., the DC step ($Qstep_{DC}$)) is applied to a single transform coefficient (e.g., the first transform coefficient) in the block, and another quantization step (e.g., the AC step ($Qstep_{AC}$)) is applied to remaining transform coefficients in the block. For example, the transform coefficients t11-t14 in the first row (e.g., the row (1511)) are DC transform coefficients. When the flag is on, the DC step ($Qstep_{DC}$) is applied to t11 in the row (1511), and the AC step ($Qstep_{AC}$) is applied to the transform coefficients t12-t14 in the row (1511). In addition, the AC step ($Qstep_{AC}$) is applied to the transform coefficients t21-t24, t31-t34, and t41-t44 in the rows (1512)-(1514), respectively.

According to aspects of the disclosure, a single quantization step (e.g., the DC step ($Qstep_{DC}$)) can be applied to quantize and/or de-quantize a plurality of transform coefficients of at least the first row or at least the first column in the block (e.g., the TB (1501)) where the block width and the block height of the block are above a size threshold (e.g., 2). In an example, the application of the single quantization step in quantizing and/or de-quantizing the plurality of transform coefficients of at least the first row or at least the first column in the block is disabled when the block width and/or the block height are less than or identical to the size threshold. In an example, the application of the single quantization step in quantizing and/or de-quantizing the plurality of transform coefficients of at least the first row or at least the first column in the block is disabled when the block width and/or the block height are less than or identical to the size threshold.

According to aspects of the disclosure, the application of the single quantization step in quantizing and/or de-quantizing the plurality of transform coefficients of at least the first row or at least the first column in the block is enabled when the block width and the block height of the block are $2^N$ and $2^M$ samples, respectively. In an example, the block width is one of, but not limited to the following sizes: 4, 8, 16, 32, 64, and 128. The block height is one of, but not limited to the following sizes: 4, 8, 16, 32, 64, and 128.

According to aspects of the disclosure, the application of the single quantization step in quantizing and/or de-quantizing the plurality of transform coefficients of at least the first row or at least the first column in the block can be indicated with a high-level syntax flag, for example, signaled in a high-level parameter set (e.g., the VPS, the SPS, the APS, the PPS) or a high-level header (e.g., the slice header).

According to aspects of the disclosure, adaptive quantization using a quantization matrix (QMatrix) can be applied to a block obtained using a transform with a 1D transform skip. A quantization matrix (QMatrix) can be extended to support blocks using a transform skip in one direction, for example, by adding additional options (e.g., one or more matrices). The transform with the 1D transform skip can be a 1D transform (e.g., a 1D vertical transform, a 1D horizontal transform). Scaling factors (or elements) in the quantization matrix (QMatrix) can be used to determine quantization steps for quantization and/or de-quantization of the block, such as that described in Eq. (3). In an embodiment, the adaptive quantization using the quantization matrix (QMatrix) can support the block with a block width and a block height that include but are not limited to 4, 8, 16, 32, 64, and 128. An index indicating the quantization matrix (QMatrix) to be applied to the block can be signaled as an unsigned 5 bit integer.

In an embodiment, the elements (or the scaling factors) in the quantization matrix (QMatrix) can be based on one or more elements of a quantization matrix that is used for (i) a transform (IDTX) including a 2D transform skip or (ii) a 2D transform without transform skip. For example, a first quantization matrix (e.g., a first QMatrix) that is used for a 2D transform without transform skip for a 4×4 luma block is {32, 43, 73, 97, 43, 67, 94, 110, 73, 94, 137, 150, 97, 110, 150, 200}. Elements in a second quantization matrix (e.g., a second QMatrix) can be from the first quantization matrix (e.g., the first QMatrix) where the second QMatrix can support a block (e.g., a luma block) using a 1D vertical transform (e.g., V_DCT). In an example, elements in the first row of the second QMatrix can use 32, elements in the second row of the second QMatrix can use 43, and the like, and the second QMatrix is {32,32,32,32; 43,43,43,43; 67,67, 67,67; 73,73,73,73}.

In an embodiment, the transform is a 1D vertical transform, such as V_LGT, V_DCT, V_ADST or V_FLIPADST, and the quantization matrix (QMatrix) can be extended with a row-wise flat matrix to support a block using the 1D vertical transform. The quantization matrix (QMatrix) can be a row-wise flat matrix where elements (or scaling factors) in each row are identical. Referring back to FIG. 15, if the quantization matrix (QMatrix) (1500) is a row-wise flat matrix, the scaling factors c11-c14 are identical, the scaling factors c21-c24 are identical, the scaling factors c31-c34 are identical, and the scaling factors c41-c44 are identical. In an embodiment, the quantization matrix (QMatrix) can be selected from a portion, such as a pre-defined row, of a quantization matrix that is used for (i) a transform (IDTX) including a 2D transform skip or (ii) a 2D transform without transform skip.

In an embodiment, the transform is a 1D horizontal transform, such as H_LGT, H_DCT, H_ADST or H_FLI-PADST, and the quantization matrix (QMatrix) can be extended with a column-wise flat matrix to support a block using the 1D horizontal transform. The quantization matrix (QMatrix) can be a column-wise flat matrix where elements (or scaling factors) in each column are identical. Referring back to FIG. 15, if the quantization matrix (QMatrix) (1500) is a column-wise flat matrix, the scaling factors c11, c21, c31, and c41 are identical, the scaling factors c12, c22, c32, and c42 are identical, the scaling factors c13, c23, c33, and c43 are identical, and the scaling factors c14, c24, c34, and c44 are identical. In an embodiment, the quantization matrix (QMatrix) can be selected from a portion, such as a predefined column, of a quantization matrix that is used for (i) a transform (IDTX) including a 2D transform skip or (ii) a 2D transform without transform skip.

Embodiments in the disclosure may be combined in any order. In an embodiment, in addition to indicating the transform skip (the 1D transform skip) in the one direction for the block, the coding information indicates that a quantization matrix (QMatrix) is enabled. The quantization matrix can include a respective element corresponding to each of the transform coefficients in the block. The elements in each row or column of the quantization matrix along the one direction can have a same value. The plurality of quantization steps can be obtained based on initial quantization steps and the quantization matrix, for example, as described by Eq. (3). In an example, the initial quantization steps include an initial DC step and an initial AC step. The initial DC step can be less than the initial AC step.

In an example, the quantization matrix and the block that is to be quantized and/or de-quantized have a same dimension (such as a same width and a same height).

The quantization matrix can be a row-wise flat matrix or a column-wise flat matrix. If the one direction is the horizontal direction, the quantization matrix is a row-wise flat matrix where elements or scaling factors in a same row of the quantization matrix are identical, and thus have an identical value (also referred to as a row value). The plurality of quantization steps can be obtained based on the initial quantization steps corresponding to rows of the transform coefficients in the block and the corresponding row values in the row-wise flat matrix.

Referring to FIG. 15, the row-wise flat matrix is a quantization matrix (1530). The quantization matrix (1530) includes rows (1531)-(1534) having the row values a-d, respectively. A dimension, such as a width and a height, of the quantization matrix (1530) can be identical to the dimension, such as the width and the height, of the TB (1501).

If the one direction is the vertical direction, the quantization matrix is a column-wise flat matrix where elements or scaling factors in a same column of the quantization matrix are identical, and thus have an identical value (also referred to as a column value). The plurality of quantization steps can be obtained based on the initial quantization steps corresponding to columns of the transform coefficients in the block and the corresponding column values in the column-wise flat matrix.

Referring to FIG. 15, the column-wise flat matrix is a quantization matrix (1540). The quantization matrix (1540) includes columns (1541)-(1544) having the column values e-h, respectively. A dimension, such as a width and a height, of the quantization matrix (1540) can be identical to the dimension, such as the width and the height, of the TB (1501).

In an embodiment, the first transform coefficients correspond to one of the initial quantization steps. Remaining transform coefficients in the block correspond to another one of the initial quantization steps. The remaining transform coefficients in the block correspond to one of (i) the remaining rows and (ii) the remaining columns in the block that have AC spatial frequencies. The one of (i) the remaining rows and (ii) the remaining columns in the block can be along the one direction. The smallest of the plurality of quantization steps can be obtained based on the one of the initial quantization steps and a value of one of a first row and a first column of the quantization matrix. The one of the first row and the first column of the quantization matrix can be along the one direction. Remaining ones of the plurality of quantization steps can be obtained for the one of the remaining rows and the remaining columns in the block based on the other one of the initial quantization steps and respective values of one of remaining rows and remaining columns of the quantization matrix. The one of the remaining rows and the remaining columns of the quantization matrix can be along the one direction.

In an example, the first transform coefficients include the transform coefficients (e.g., t11-t14) in the first row (e.g., the row (1511)) of the block (e.g., the TB (1501)). The first transform coefficients (e.g., t11-t14) correspond to the one (e.g., the initial DC step) of the initial quantization steps, and the remaining transform coefficients in the block correspond to the remaining rows (e.g., the rows (1512)-(1514)) of the transform coefficients in the block that have AC spatial frequencies. The remaining transform coefficients in the block correspond to the other one (e.g., the initial AC step) of the initial quantization steps.

The plurality of quantization steps can be obtained based on the initial quantization steps and the quantization matrix (1530). The smallest of the plurality of quantization steps (e.g., a final DC step) for the first row (1511) can be obtained based on the initial DC step and the value (e.g., the row value a in the quantization matrix (1530)) of the first row of the quantization matrix. A final AC step for the row (1512) can be obtained based on the other one of the initial quantization steps (e.g., the initial AC step) and the row value b. A final AC step for the row (1513) can be obtained based on the other one of the initial quantization steps (e.g., the initial AC step) and the row value c. A final AC step for the row (1514) can be obtained based on the other one of the initial quantization steps (e.g., the initial AC step) and the row value d. The remaining ones of the plurality of quantization steps for the remaining rows (1512)-(1514) include the final AC steps for the rows (1512)-(1514), respectively. As can be seen here, in an example, the plurality of quantization steps includes more than two quantization steps, such as four quantization steps including the final DC step for the first row (1511) and the final AC steps for the rows (1512)-(1514).

In an example, the first transform coefficients include the transform coefficients (e.g., t11, t21, t31, and t41) in the first column (e.g., the column (1521)) of the block (e.g., the TB (1501)). The first transform coefficients (e.g., t11, t21, t31, and t41) correspond to the one (e.g., the initial DC step) of the initial quantization steps, and the remaining transform coefficients in the block correspond to the remaining columns (e.g., the columns (1522)-(1524)) of the transform coefficients in the block that have AC spatial frequencies.

The remaining transform coefficients in the block correspond to the other one (e.g., the initial AC step) of the initial quantization steps.

The plurality of quantization steps can be obtained based on the initial quantization steps and the quantization matrix (1540). The smallest of the plurality of quantization steps (e.g., a final DC step) for the first column (1521) can be obtained based on the initial DC step and the value (e.g., the column value e in the quantization matrix (1540)) of the first column of the quantization matrix. A final AC step for the column (1522) can be obtained based on the other one of the initial quantization steps (e.g., the initial AC step) and the column value f. A final AC step for the column (1523) can be obtained based on the other one of the initial quantization steps (e.g., the initial AC step) and the column value g. A final AC step for the column (1524) can be obtained based on the other one of the initial quantization steps (e.g., the initial AC step) and the column value h. The remaining ones of the plurality of quantization steps for the remaining columns (1522)-(1524) include the final AC steps for the columns (1522)-(1524), respectively.

In an embodiment, the first transform coefficients further include one of (i) one or more rows of the transform coefficients in the block that are adjacent to the first row and (ii) one or more columns of the transform coefficients in the block that are adjacent to the first column. The one of (i) the one or more rows and (ii) the one or more columns in the block can be along the one direction. The first transform coefficients correspond to one of the initial quantization steps, remaining transform coefficients in the block correspond to another one of the initial quantization steps. The smallest of the plurality of quantization steps can be obtained based on the one of the initial quantization steps and a value of one of a first row and a first column of the quantization matrix. The one of the first row and the first column of the quantization matrix can be along the one direction.

Referring again to FIG. 15, in an example, the one direction is the horizontal direction. The one of (i) the one or more rows and (ii) the one or more columns in the block is along the horizontal direction, and thus includes the one or more rows (e.g., the row (1512)) of the transform coefficients in the block that are adjacent to the first row (e.g., the row (1511)). The first transform coefficients further includes the one or more rows (e.g., the row (1512)) of the transform coefficients in the block that are adjacent to the first row (e.g., the row (1511)), and the remaining transform coefficients in the block correspond to the remaining rows (e.g., the rows (1513)-(1514)) of the transform coefficients in the block. The first transform coefficients (e.g., t11-t14 in the row (1511) and t21-t24 in the row (1512)) correspond to the one (e.g., the initial DC step) of the initial quantization steps, and the remaining transform coefficients (e.g., t31-t34 in the row (1513) and t41-t44 in the row (1514)) in the block correspond to the other one (e.g., the initial AC step) of the initial quantization steps. The plurality of quantization steps can be obtained based on the initial quantization steps and the quantization matrix (1530). The plurality of quantization steps can include a final step for the first row (1511), a final step for the row (1512), a final step for the row (1513), and a final step for the row (1514). The final step for the first row (1511) can be obtained based on the initial DC step and the row value a. The final step for the row (1512) can be obtained based on the initial DC step and the row value b. The final step for the row (1513) can be obtained based on the initial AC step and the row value c. The final step for the row (1514) can be obtained based on the initial AC step and the row value d. The smallest of the plurality of quantization steps is the final step for the first row (1511). Remaining ones of the plurality of quantization steps for the remaining rows (1512)-(1514) include the final steps for the rows (1512)-(1514), respectively.

Referring again to FIG. 15, in an example, the one direction is the vertical direction. The one of (i) the one or more rows and (ii) the one or more columns in the block is along the vertical direction, and thus includes the one or more columns (e.g., the column (1522)) of the transform coefficients in the block that are adjacent to the first column (e.g., the column (1521)). The first transform coefficients further include the one or more columns (e.g., the column (1522)) of the transform coefficients in the block that are adjacent to the first column (e.g., the row (1521)), and the remaining transform coefficients in the block correspond to the remaining columns (e.g., the column (1523)-(1524)) of the transform coefficients in the block. The first transform coefficients (e.g., t11, t21, t31, and t42 in the column (1521) and t12, t22, t32, and t42 in the column (1522)) correspond to the one (e.g., the initial DC step) of the initial quantization steps, and the remaining transform coefficients (e.g., t13, t23, t33, and t43 in the column (1523) and t14, t24, t34, and t44 in the column (1524)) in the block correspond to the other one (e.g., the initial AC step) of the initial quantization steps. The plurality of quantization steps can be obtained based on the initial quantization steps and the quantization matrix (1540). The plurality of quantization steps can include a final step for the first column (1521), a final step for the column (1522), a final step for the column (1523), and a final step for the column (1524). The final step for the first column (1521) can be obtained based on the initial DC step and the column value e. The final step for the column (1522) can be obtained based on the initial DC step and the column value f. The final step for the column (1523) can be obtained based on the initial AC step and the column value g. The final step for the column (1524) can be obtained based on the initial AC step and the column value h. The smallest of the plurality of quantization steps can be the final step for the first column (1521). Remaining ones of the plurality of quantization steps for the remaining columns (1522)-(1524) include the final steps for the columns (1522)-(1524), respectively.

Figure 16:
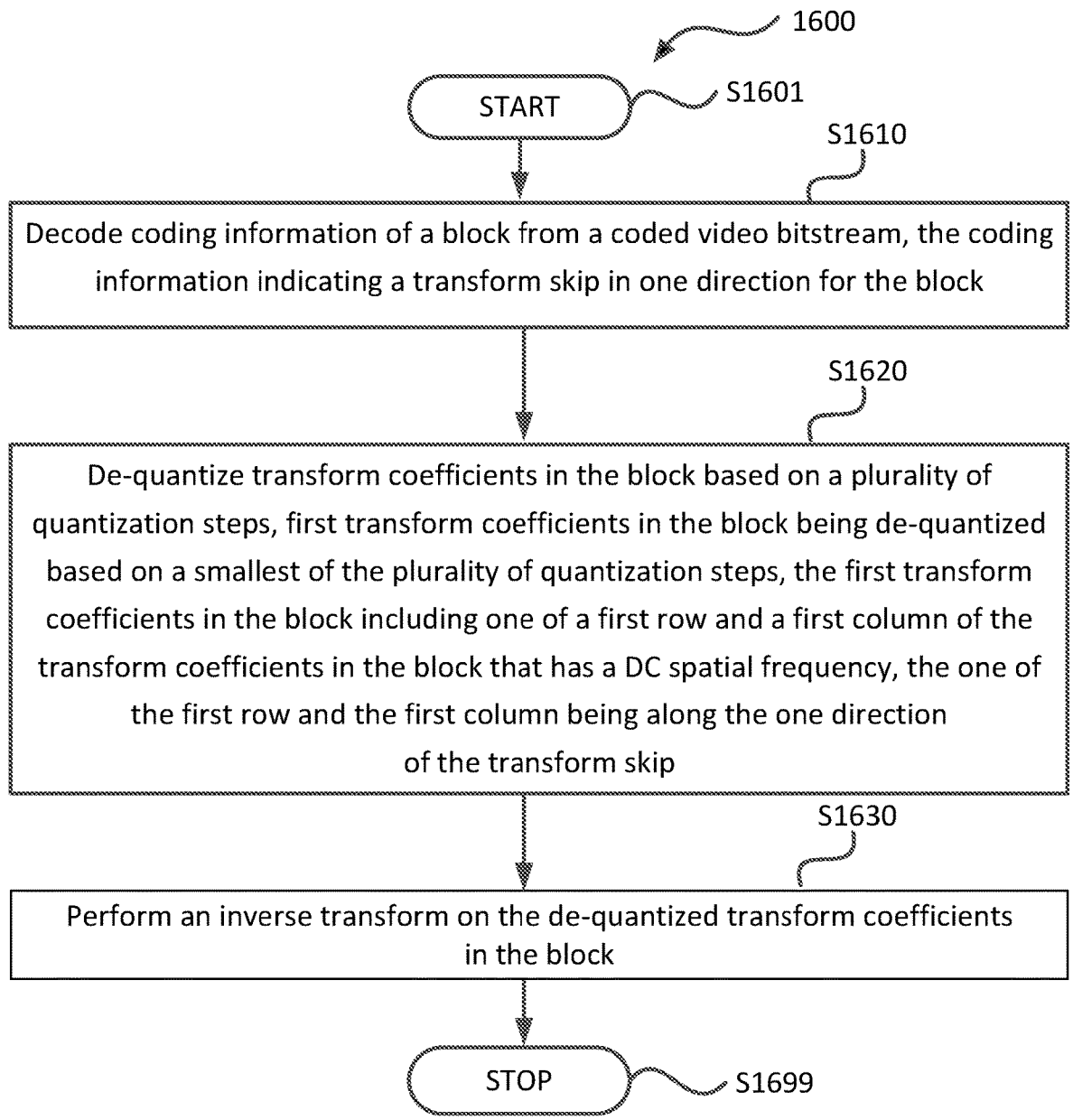
FIG. 16 shows a flow chart outlining a process (1600) according to an embodiment of the disclosure.

FIG. 16 shows a flow chart outlining a process (1600) according to an embodiment of the disclosure. The process (1600) can be used in the reconstruction of a block, such as a TB. The term block in the disclosure may refer to a TB, a TU, or the like. In various embodiments, the process (1600) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1600) is implemented in software instructions, thus when the processing circuitry executes the software instructions, the processing circuitry performs the process (1600). The process starts at (S1601) and proceeds to (S1610).

At (S1610), coding information of the block (e.g., the TB) can be decoded from a coded video bitstream. The coding information indicating a transform skip in one direction for the TB. The one direction can be a horizontal direction or a vertical direction.

At (S1620), transform coefficients in the block can be de-quantized based on a plurality of quantization steps. In an example, the plurality of quantization steps includes the DC step (e.g., the $Qstep_{DC}$) and the AC step (e.g., the $Qstep_{AC}$). First transform coefficients in the block can be de-quantized based on a smallest (e.g., the $Qstep_{DC}$) of the plurality of quantization steps where the first transform coefficients in the block can include one of a first row and a first column of the transform coefficients in the block that has a DC spatial frequency. The one of the first row and the first column can be along the one direction of the transform skip.

In an example, the one direction is the horizontal direction, and the one of the first row and the first column is the first row of the transform coefficients in the block. The first row of the transform coefficients in the block includes DC transform coefficients having the DC spatial frequency. The first row of the transform coefficients in the block can be de-quantized based on the smallest (e.g., the $Qstep_{DC}$) of the plurality of quantization steps, and remaining rows of the transform coefficients in the block can be de-quantized based on another one (e.g., the $Qstep_{AC}$) of the plurality of quantization steps.

In an example, the one direction is the horizontal direction, and the one of the first row and the first column is the first row of the transform coefficients in the block. The first transform coefficients in the block can further include one or more additional rows of the transform coefficients in the block that are adjacent to the first row. The first row and the one or more additional rows of the transform coefficients in the block can be de-quantized based on the smallest (e.g., the $Qstep_{DC}$) of the plurality of quantization steps. Remaining rows of the transform coefficients in the block can be de-quantized based on another one (e.g., the $Qstep_{AC}$) of the plurality of quantization steps.

In an example, the one direction is the vertical direction, and the one of the first row and the first column is the first column of the transform coefficients in the block. The first column of the transform coefficients in the block includes DC transform coefficients having the DC spatial frequency. The first column of the transform coefficients in the block can be de-quantized based on the smallest (e.g., the $Qstep_{DC}$) of the plurality of quantization steps, and remaining columns of the transform coefficients in the block can be de-quantized based on another one (e.g., the $Qstep_{AC}$) of the plurality of quantization steps.

In an example, the one direction is the vertical direction, and the one of the first row and the first column is the first column of the transform coefficients in the block. The first transform coefficients in the block can further include one or more additional columns of the transform coefficients in the block that are adjacent to the first column. The first column and the one or more additional columns of the transform coefficients in the block can be de-quantized based on the smallest (e.g., the $Qstep_{DC}$) of the plurality of quantization steps. Remaining columns of the transform coefficients in the block can be de-quantized based on another one (e.g., the $Qstep_{AC}$) of the plurality of quantization steps.

At (S1630), an inverse transform can be performed on the de-quantized transform coefficients in the block.

The process (1600) can be suitably adapted. Step(s) in the process (1600) can be modified and/or omitted. Additional step(s) can be added. Any suitable order of implementation can be used. For example, the coding information can further include a flag, or other signaling information, indicating whether the first transform coefficients are to be de-quantized based on the smallest of the plurality of quantization steps. If the decoded flag indicates that the first transform coefficients are to be de-quantized based on the smallest of the plurality of quantization steps, the first transform coefficients in the TB are de-quantized based on the smallest of the plural of quantization steps.

In an example, the coding information further indicates when a quantization matrix is enabled. The quantization matrix includes a respective element corresponding to each of the transform coefficients in the block. The elements in each row or column of the quantization matrix along the one direction having a same value. The plurality of quantization steps can be obtained based on initial quantization steps and the quantization matrix.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
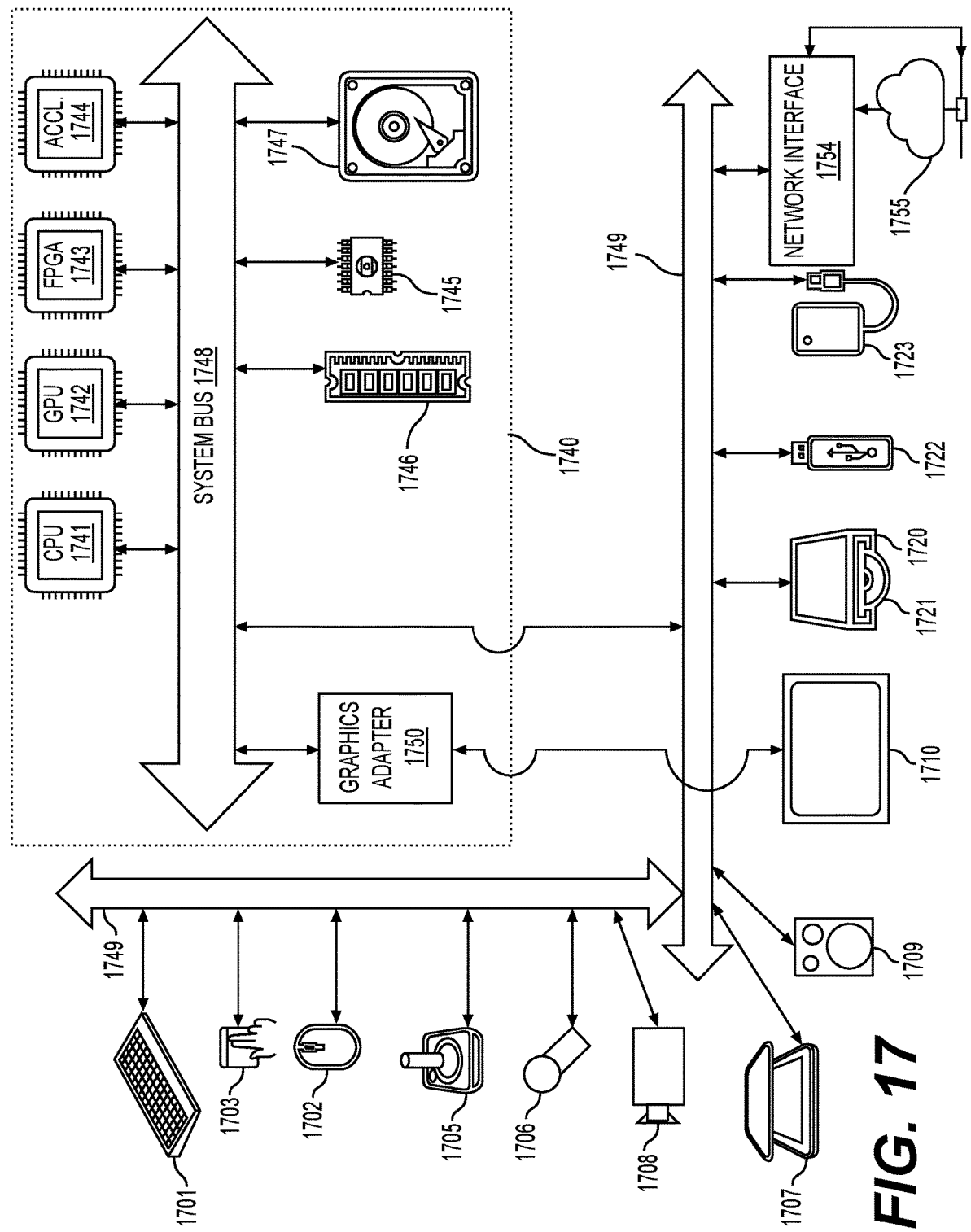
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface (1754) to one or more communication networks (1755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), graphics adapters (~~50), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). In an example, the screen (1710) can be connected to the graphics adapter (1750). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding coding information of a transform block (TB) from a coded video bitstream, the coding information indicating a transform skip in one direction for the TB;
    de-quantizing transform coefficients in the TB based on a plurality of quantization steps, first transform coefficients in the TB being de-quantized based on a smallest of the plurality of quantization steps, the first transform coefficients in the TB including one of a first row and a first column of the transform coefficients in the TB that has a DC spatial frequency, the one of the first row and the first column being along the one direction of the transform skip; and
    performing an inverse transform on the de-quantized transform coefficients in the TB.

2. The method of claim 1, wherein
    the one direction is a horizontal direction,
    the one of the first row and the first column is the first row of the transform coefficients in the TB, and
    the de-quantizing includes
        de-quantizing the first row of the transform coefficients in the TB based on the smallest of the plurality of quantization steps, and
        de-quantizing remaining rows of the transform coefficients in the TB based on another one of the plurality of quantization steps.

3. The method of claim 1, wherein
    the one direction is a horizontal direction,
    the one of the first row and the first column is the first row of the transform coefficients in the TB, and
    the de-quantizing includes
        de-quantizing the first row and one or more additional rows of the transform coefficients in the TB that are adjacent to the first row based on the smallest of the plurality of quantization steps, the first transform coefficients in the TB further including the one or more additional rows of the transform coefficients in the TB, and
        de-quantizing remaining rows of the transform coefficients in the TB based on another one of the plurality of quantization steps.

4. The method of claim 1, wherein
    the one direction is a vertical direction,
    the one of the first row and the first column is the first column of the transform coefficients in the TB, and
    the de-quantizing includes
        de-quantizing the first column of the transform coefficients in the TB based on the smallest of the plurality of quantization steps, and
        de-quantizing remaining columns of the transform coefficients in the TB based on another one of the plurality of quantization steps.

5. The method of claim 1, wherein
    the one direction is a vertical direction,
    the one of the first row and the first column is the first column of the transform coefficients in the TB, and
    the de-quantizing includes
        de-quantizing the first column and one or more additional columns of the transform coefficients in the TB that are adjacent to the first column based on the smallest of the plurality of quantization steps, the first transform coefficients in the TB further including the one or more additional columns of the transform coefficients in the TB, and
        de-quantizing remaining columns of the transform coefficients in the TB based on another one of the plurality of quantization steps.

6. The method of claim 1, wherein
    the decoding the coding information further includes decoding a flag, the flag indicating whether to de-quantize the first transform coefficients based on the smallest of the plurality of quantization steps; and
    the first transform coefficients in the TB are de-quantized based on the smallest of the plural of quantization steps in response to the flag indicating that the first transform coefficients are to be de-quantized based on the smallest of the plurality of quantization steps.

7. The method of claim 6, wherein the flag is associated with one of: the TB, a plurality of TBs including the TB, a coding tree block, and a tile.

8. The method of claim 6, wherein the flag is indicated in one of a video parameter set (VPS), an sequence parameter set (SPS), an adaptive parameter set (APS), a picture parameter set (PPS), and a slice header.

9. The method of claim 1, wherein a height and a width of the TB are $2^N$ and $2^M$ samples, respectively, N and M being integers larger than 1.

10. The method of claim 1, wherein
    the coding information further indicates that a quantization matrix is enabled,
    the quantization matrix includes a respective element corresponding to each of the transform coefficients in the TB,
    the elements in each row or column of the quantization matrix along the one direction having a same value, and the method further includes obtaining the plurality of quantization steps based on initial quantization steps and the quantization matrix.

11. The method of claim 10, wherein
the first transform coefficients correspond to one of the initial quantization steps,
remaining transform coefficients in the TB that correspond to one of (i) the remaining rows and (ii) the remaining columns in the TB that have AC spatial frequencies correspond to another one of the initial quantization steps, the one of (i) the remaining rows and (ii) the remaining columns in the TB being along the one direction, and
the obtaining the plurality of quantization steps includes
obtaining the smallest of the plurality of quantization steps based on the one of the initial quantization steps and a value of one of a first row and a first column of the quantization matrix, the one of the first row and the first column of the quantization matrix being along the one direction, and
obtaining remaining ones of the plurality of quantization steps for the one of the remaining rows and the remaining columns in the TB based on the other one of the initial quantization steps and respective values of one of remaining rows and remaining columns of the quantization matrix, the one of the remaining rows and the remaining columns of the quantization matrix being along the one direction.

12. The method of claim 10, wherein
the first transform coefficients further include one of (i) one or more rows of the transform coefficients in the TB that are adjacent to the first row and (ii) one or more columns of the transform coefficients in the TB that are adjacent to the first column, the one of (i) the one or more rows and (ii) the one or more columns in the TB being along the one direction,
the first transform coefficients correspond to one of the initial quantization steps,
remaining transform coefficients in the TB correspond to another one of the initial quantization steps, and
the obtaining the plurality of quantization steps includes
obtaining the smallest of the plurality of quantization steps based on the one of the initial quantization steps and a value of one of a first row and a first column of the quantization matrix, the one of the first row and the first column of the quantization matrix being along the one direction.

13. An apparatus for video decoding, comprising processing circuitry configured to:
decode coding information of a transform block (TB) from a coded video bitstream, the coding information indicating a transform skip in one direction for the TB;
de-quantize transform coefficients in the TB based on a plurality of quantization steps, first transform coefficients in the TB being de-quantized based on a smallest of the plurality of quantization steps, the first transform coefficients in the TB including one of a first row and a first column of the transform coefficients in the TB that has a DC spatial frequency, the one of the first row and the first column being along the one direction of the transform skip; and
perform an inverse transform on the de-quantized transform coefficients in the TB.

14. The apparatus of claim 13, wherein
the one direction is a horizontal direction,
the one of the first row and the first column is the first row of the transform coefficients in the TB, and
the processing circuitry is configured to:
de-quantize the first row of the transform coefficients in the TB based on the smallest of the plurality of quantization steps, and
de-quantize remaining rows of the transform coefficients in the TB based on another one of the plurality of quantization steps.

15. The apparatus of claim 13, wherein
the one direction is a horizontal direction,
the one of the first row and the first column is the first row of the transform coefficients in the TB, and
the processing circuitry is configured to:
de-quantize the first row and one or more additional rows of the transform coefficients in the TB that are adjacent to the first row based on the smallest of the plurality of quantization steps, the first transform coefficients in the TB further including the one or more additional rows of the transform coefficients in the TB, and
de-quantize remaining rows of the transform coefficients in the TB based on another one of the plurality of quantization steps.

16. The apparatus of claim 13, wherein
the one direction is a vertical direction,
the one of the first row and the first column is the first column of the transform coefficients in the TB, and
the processing circuitry is configured to:
de-quantize the first column of the transform coefficients in the TB based on the smallest of the plurality of quantization steps, and
de-quantize remaining columns of the transform coefficients in the TB based on another one of the plurality of quantization steps.

17. The apparatus of claim 13, wherein
the one direction is a vertical direction,
the one of the first row and the first column is the first column of the transform coefficients in the TB, and
the processing circuitry is configured to:
de-quantize the first column and one or more additional columns of the transform coefficients in the TB that are adjacent to the first column based on the smallest of the plurality of quantization steps, the first transform coefficients in the TB further including the one or more additional columns of the transform coefficients in the TB, and
de-quantize remaining columns of the transform coefficients in the TB based on another one of the plurality of quantization steps.

18. The apparatus of claim 13, wherein the processing circuitry is configured to:
decode a flag, the flag indicating whether to de-quantize the first transform coefficients based on the smallest of the plurality of quantization steps; and
de-quantize the first transform coefficients in the TB based on the smallest of the plural of quantization steps in response to the flag indicating that the first transform coefficients are to be de-quantized based on the smallest of the plurality of quantization steps.

19. The apparatus of claim 13, wherein
the coding information further indicates that a quantization matrix is enabled,
the quantization matrix includes a respective element corresponding to each of the transform coefficients in the TB,
the elements in each row or column of the quantization matrix along the one direction having a same value, and the processing circuitry is configured to obtain the plurality of quantization steps based on initial quantization steps and the quantization matrix.

20. A non-transitory computer-readable storage medium storing a program executable by at least one processor to perform:

decoding coding information of a transform block (TB) from a coded video bitstream, the coding information indicating a transform skip in one direction for the TB;

de-quantizing transform coefficients in the TB based on a plurality of quantization steps, first transform coefficients in the TB being de-quantized based on a smallest of the plurality of quantization steps, the first transform coefficients in the TB including one of a first row and a first column of the transform coefficients in the TB that has a DC spatial frequency, the one of the first row and the first column being along the one direction of the transform skip; and performing an inverse transform on the de-quantized transform coefficients in the TB.

* * * * *